US007250852B1

(12) United States Patent
Kell

(10) Patent No.: US 7,250,852 B1
(45) Date of Patent: Jul. 31, 2007

(54) HANDHELD TIRE SENSOR COMMUNICATION DEVICE

(76) Inventor: Curtis Kell, 35417 Oak Knoll Rd., Burlington, WI (US) 53105

( * ) Notice: Subject to any disclaimer, the term of this patent is extended or adjusted under 35 U.S.C. 154(b) by 144 days.

(21) Appl. No.: 11/042,657

(22) Filed: Jan. 25, 2005

Related U.S. Application Data

(60) Provisional application No. 60/540,315, filed on Jan. 29, 2004.

(51) Int. Cl.
*B60C 23/00* (2006.01)
(52) U.S. Cl. ..................... 340/447; 340/445; 340/10.1; 73/146.4; 73/146.5
(58) Field of Classification Search ................. 340/447
See application file for complete search history.

(56) References Cited

U.S. PATENT DOCUMENTS 5,516,379 A * 5/1996 Schultz ....................... 152/415
6,087,930 A * 7/2000 Kulka et al. ................. 340/447
6,243,007 B1 * 6/2001 McLaughlin et al. ........ 340/447
6,414,592 B1 * 7/2002 Dixit et al. .................. 340/447
6,486,776 B1 * 11/2002 Pollack et al. .............. 340/521

* cited by examiner

*Primary Examiner*—Donnie L. Crosland
(74) *Attorney, Agent, or Firm*—Michael I Kroll

(57) ABSTRACT

A device for interrogating at least one data sensor positioned at least one of within a vehicle tire and adjacent to a vehicle tire. The device includes a housing, remotely located from the at least one data sensor having a processor positioned therein. Means for sending and receiving at least one data signal for receipt by said sensor is connected to the processor. A least one input button is connected to the processor for activation thereof. A display is connected to the processor for displaying data thereon. The sensor generates, in response to the at least one data signal, a response signal having data corresponding to at least one of a sensed and a stored data value and the response signal is received by the sending and receiving means for display on the display.

10 Claims, 24 Drawing Sheets

HANDHELD TIRE SENSOR COMMUNICATION DEVICE

RELATED APPLICATION

This application is subject to U.S. provisional application Ser. No. 60/540,315, filed 29 Jan. 2004.

Please incorporate by reference all information in said provisional application into this instant application.

BACKGROUND OF THE INVENTION

1. Field of the Invention

The present invention relates generally to a communication device and, more specifically, to a handheld device for communicating with a sensor positioned within a vehicle tire. The device includes a housing having circuitry contained therein connected to a low-frequency transceiver. The device is able to communicate with the tire sensor for receiving data sensed thereby and providing the received data to a user for evaluation thereof. Additionally, the device is able to transmit instructional data to selectively adjust the operation of the sensor on the tire.

2. Description of the Prior Art

Radios Frequency (RF) based Tire Pressure Monitoring (TPM) systems have been available commercially on many automobiles and trucks in the past several years. The systems vary from simple to complex. The simplest systems may only report low tire pressure, while the more complex systems may report data such as actual tire pressure, tire temperature as well as the condition of the power source of at least one of the sensor and transmitter.

TPM systems are typically comprised of two primary components: (1) battery powered sensor/transmitter modules, which are mounted within each tire of the vehicle; and (2) a central receiver module that alerts the driver when a tire's pressure is at least one of below or above a pre-stored acceptable tire pressure limit.

Tire mounted sensor/transmitters periodically measure the pressure (and temperature) internal to a tire and report via a RF transmission at least one of the tire pressure and tire temperature. Alternatively, the sensor may only report if the tire pressure is low or high. The complexity of the system determines what data is actually reported.

The receiver module is continuously monitoring for RF signals sent from a sensor/transmitter. If a transmission is received, the receiver may update a digital display of tire pressure for a given tire, or sound an alarm to indicate that a low or high-pressure alert message was received from a sensor/transmitter module.

While these systems perform the intended functions necessary to implement a tire pressure monitoring system, there exists a need for a tool to communicate directly with a tire mounted sensor/transmitter to interrogate the sensor/transmitter for useful information such as battery condition, tire pressure, tire temperature, and the like. Furthermore, it is desirous that this tool be a hand held communication tool. It is also desirable for the device to be able send commands to the tire mounted sensor/transmitter module instructing it to perform a variety of functions.

While the tire sensing devices described above may be suitable for the purposes for which they were designed, they would not be as suitable for the purposes of the present invention, as hereinafter described.

SUMMARY OF THE PRESENT INVENTION

The present invention relates generally to a communication device and, more specifically, to a handheld device for communicating with a sensor positioned within a vehicle tire. The device includes a housing having circuitry contained therein connected to a low-frequency transceiver. The device is able to communicate with the tire sensor for receiving data sensed thereby and providing the received data to a user for evaluation thereof. Additionally, the device is able to transmit instructional data to selectively adjust the operation of the sensor on the tire.

A primary object of the present invention is to provide a handheld tire sensor communication device that overcomes the shortcomings of the prior art.

Another, secondary object of the present invention is to provide a handheld tire sensor communication device for use with Tire Pressure Monitoring Sensor/Transmitters that are installed on the wheel drums of a vehicle.

Another object of the present invention is to provide a handheld tire sensor communication device that provides a method to check status and integrity of the sensor/transmitter modules mounted within the tire without the need to interact with the vehicle's TPM receiver module. Service technicians, vehicle owners and the like can periodically check the status of a sensor/transmitter module by using this tool.

Another object of the present invention is to provide a handheld tire sensor communication device that allows a user to selectively determine the air pressure within each tire without the vehicle operator manually checking the pressure within each respective tire with a tire air pressure gauge.

Yet another object of the present invention is to provide a handheld tire sensor communication device that transmits a low frequency message signal to the tire mounted sensor/transmitter module instructing the sensor to transmit at least one of the tire pressure, battery condition, or general sensor/transmitter status via an radio frequency (RF) signal to the device for analysis by the user.

Still yet another object of the present invention is to provide a handheld tire sensor communication device wherein the hand held communicator receives this RF message and displays the received data tire pressure or other status data on a digital display.

Yet another object of the present invention is to provide a handheld tire sensor communication device wherein the device emits a low frequency transmission whose primary field is a magnetic field.

Still a further object of the present invention is to provide a handheld tire sensor communication device wherein the signal transmitted by the device is at a rate of 125 KHz which is a common frequency for communicating over short distances.

Another object of the present invention is to provide a handheld tire sensor communication device that allows for reading a tire pressure at any time and not merely when the tire pressure is at least one of above and below a threshold value. This implies that a specific upper and lower limit was programmed into the sensor/transmitter module during its manufacturing process. However, it may be necessary to re-program the sensor/transmitter unit's upper and lower pressure limits after leaving the factory. This capability could be used if the vehicle switches to a different brand of tire that requires different pressure limits. Additionally, other instances exist wherein a different pressure limit would be required, such as tire rotation from the front to back of a Pick-Up truck.

An even further object of the present invention is to provide a handheld tire sensor communication device wherein the device is able to send an instruction signal for receipt by the tire mounted sensor/transmitter module mounted in the vehicle instructing the sensor to update a desired setting.

Still another object of the present invention is to provide a handheld tire sensor communication device that selects the new pressure limits via a plurality of input buttons positioned on a housing thereof.

An additional object of the present invention is to provide a handheld tire sensor communication device wherein the LCD or LED is used to display the changes input by the plurality of input buttons to provide a visual check to the user prior to changing the settings.

A further object of the present invention is to provide a handheld tire sensor communication device including a transmit button for transmitting the newly changed settings so that the settings displayed on the display are included in the instruction signal transmitted by the device for receipt by the sensor on a respective tire.

Yet another object of the present invention is to provide a handheld tire sensor communication device able to receive a periodically reported data signal which corresponds to a specific tire on the vehicle.

Yet an even further object of the present invention is to provide a handheld tire sensor communication device that is selectively programmable to only communicate with sensors having specific identification numbers.

Another object of the present invention is to provide a handheld tire sensor communication device able to store the unique sensor ID corresponding to a specific sensor along with the position of the wheel drum on which the sensor is mounted.

Still another object of the present invention is to provide a handheld tire sensor communication device able to provide at least one of audible alerts and visual alerts to a user if the device detects that a respective tire corresponding to a programmed vehicle ID number is transmitting a status signal including data that is at least one of above or below a threshold value.

Yet an even further object of the present invention is to provide a handheld tire sensor communication device able to transmit an instruction signal including data corresponding to a new position on a vehicle thereby updating the sensor unit to have the sensor ID correspond to the new position of the tire.

Yet another object of the present invention is to provide a handheld tire sensor communication device that is simple and easy to use.

Still yet another object of the present invention is to provide a handheld tire sensor communication device that is cost effective to manufacture and inexpensive to operate.

Additional objects of the present invention will appear as the description proceeds.

The present invention overcomes the shortcomings of the prior art by providing a handheld device for communicating with a sensor positioned within a vehicle tire. The device includes a housing having circuitry contained therein connected to a low-frequency transceiver. The device is able to communicate with the tire sensor for receiving data sensed thereby and providing the received data to a user for evaluation thereof. Additionally, the device is able to transmit instructional data to selectively adjust the operation of the sensor on the tire.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
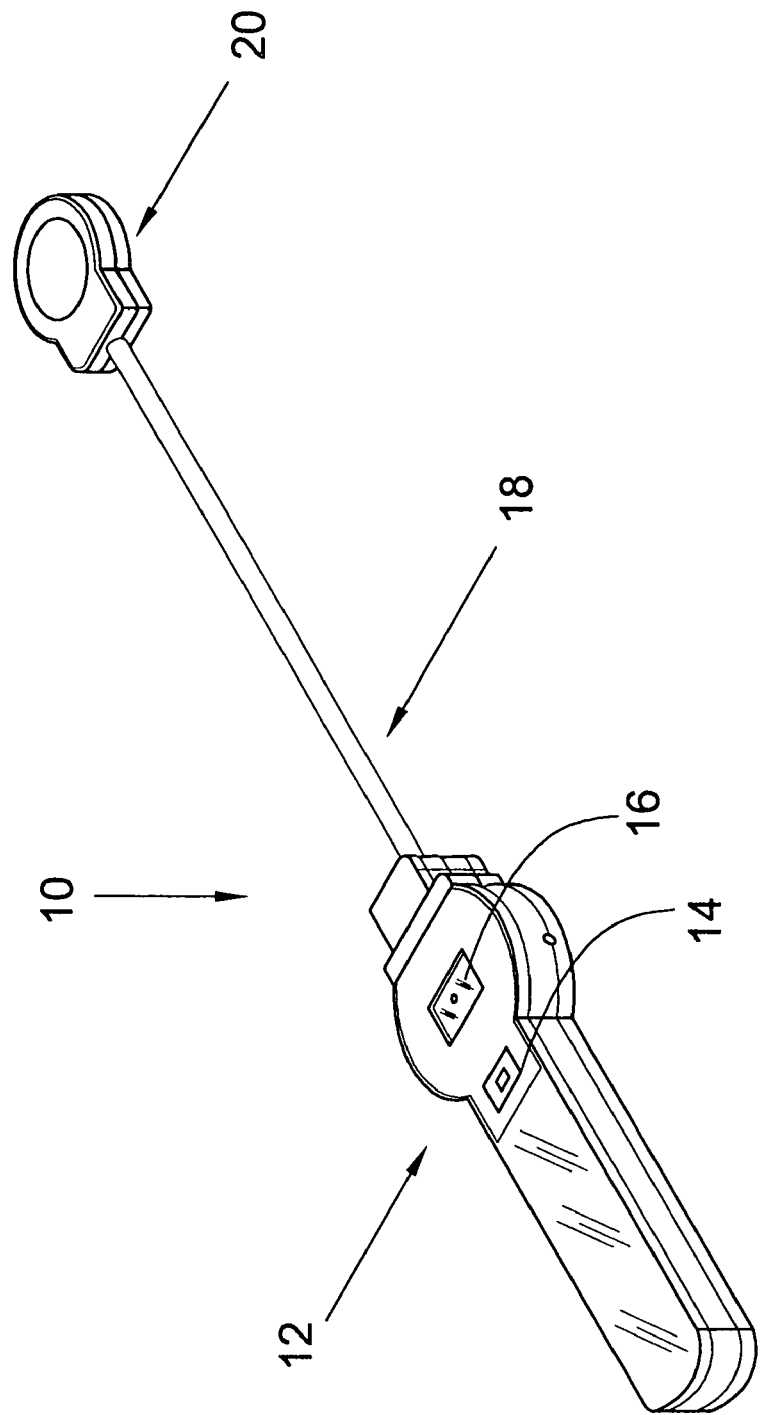
FIG. 1 is a perspective view of a handheld tire sensor communication device of the present invention.

Turning now descriptively to the drawings, in which similar reference characters denote similar elements throughout the several views, the Figures illustrate the handheld tire sensor communication device of the present invention. With regard to the reference numerals used, the following numbering is used throughout the various drawing figures.

- 10 handheld tire sensor communication device of the present invention
- 12 handle housing
- 14 input button or buttons
- 16 display screen
- 18 extension tube
- 19 backing member
- 20 remote housing
- 21 remote circuitry
- 22 power connecter
- 24 battery cover
- 26 fastener
- 28 battery compartment
- 30 microcontroller
- 32 voltage regulator
- 34 power source
- 36 charging circuit
- 38 RF receiver
- 40 receiver antenna
- 42 transmitter
- 44 transmitter antenna
- 46 tire sensor
- 48 rim
- 50 set button
- 52 transmission button
- 54 increase button
- 56 decrease button
- 58 extender member
- 60 connectors
- 62 auxiliary handle
- 64 interrogation button
- 65 tire selector buttons
- 66 first tire selector
- 68 second tire selector
- 70 third tire selector
- 72 fourth tire selector
- 74 first sub-tire selector
- 76 second sub-tire selector
- 78 third sub-tire selector
- 80 fourth sub-tire selector
- 82 tractor tire selector
- 84 trailer tire selector

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 22 illustrate a handheld tire sensor communication device of the present invention which is indicated generally by the reference numeral 10.

FIG. 1 is a perspective view of a handheld tire sensor communication device, hereinafter the "device" of the present invention. The device includes a handle housing 12 having an extension tube 18 extending from an end thereof. A remote housing 20 is connected at an end of the extension tube 18 opposite the handle housing 12. The handle housing 12 further includes at least one input button 14 for operation of the device 10 of the present invention. Also positioned on the handle housing 12 is a display screen 16 for displaying data thereon. The display screen 16 is at least one of a liquid crystal display (LCD) and a light emitting diode (LED) display.

Figure 13:
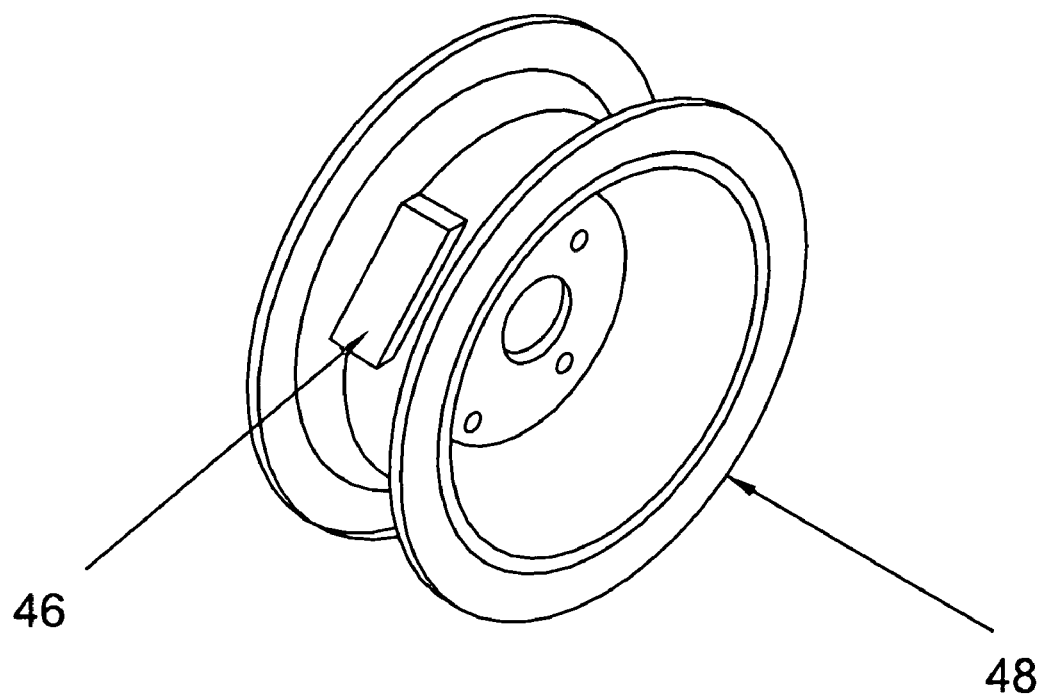
FIG. 13 is a perspective view of a sensor that communicates with the handheld tire sensor communication device of the present invention.
Figure 14:
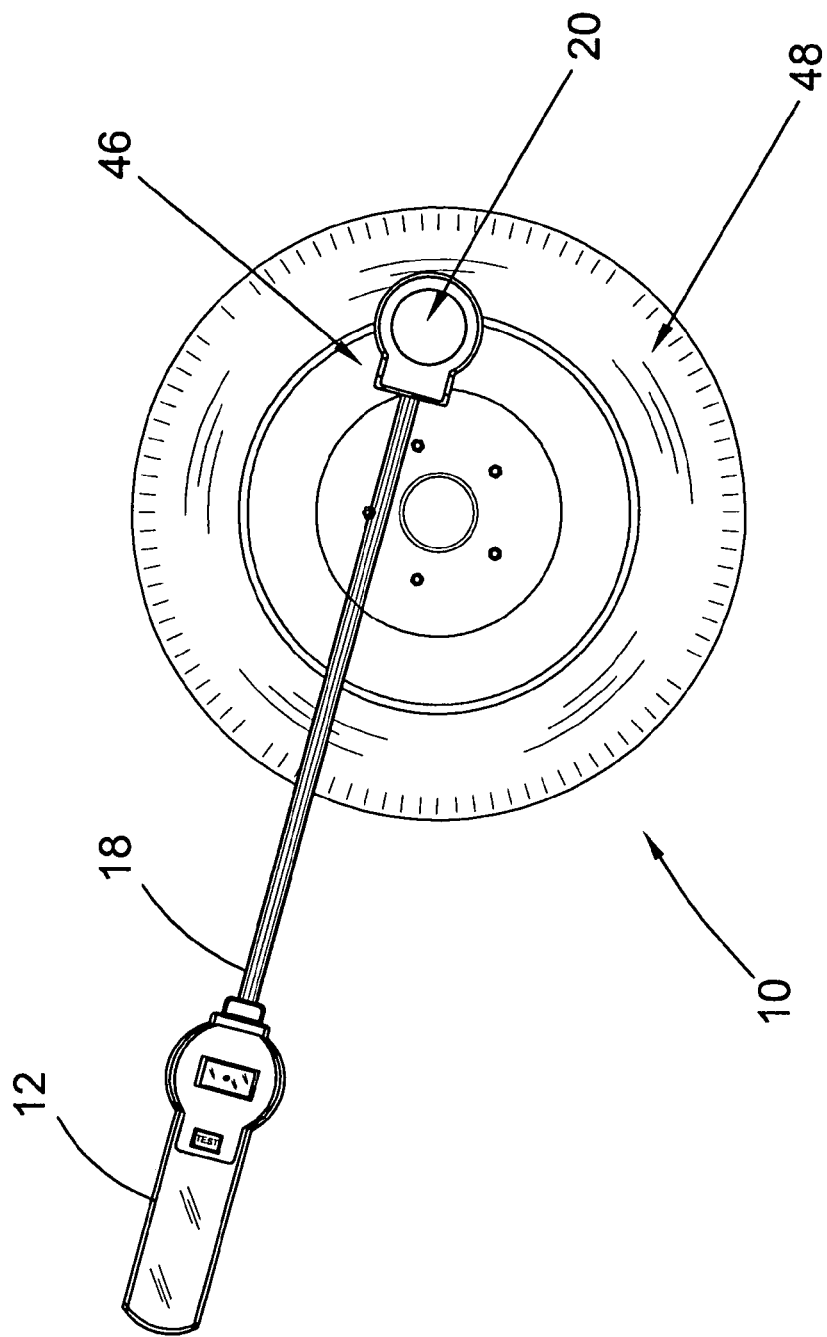
FIG. 14 is a perspective view of a handheld tire sensor communication device of the present invention in use.
Figure 15:
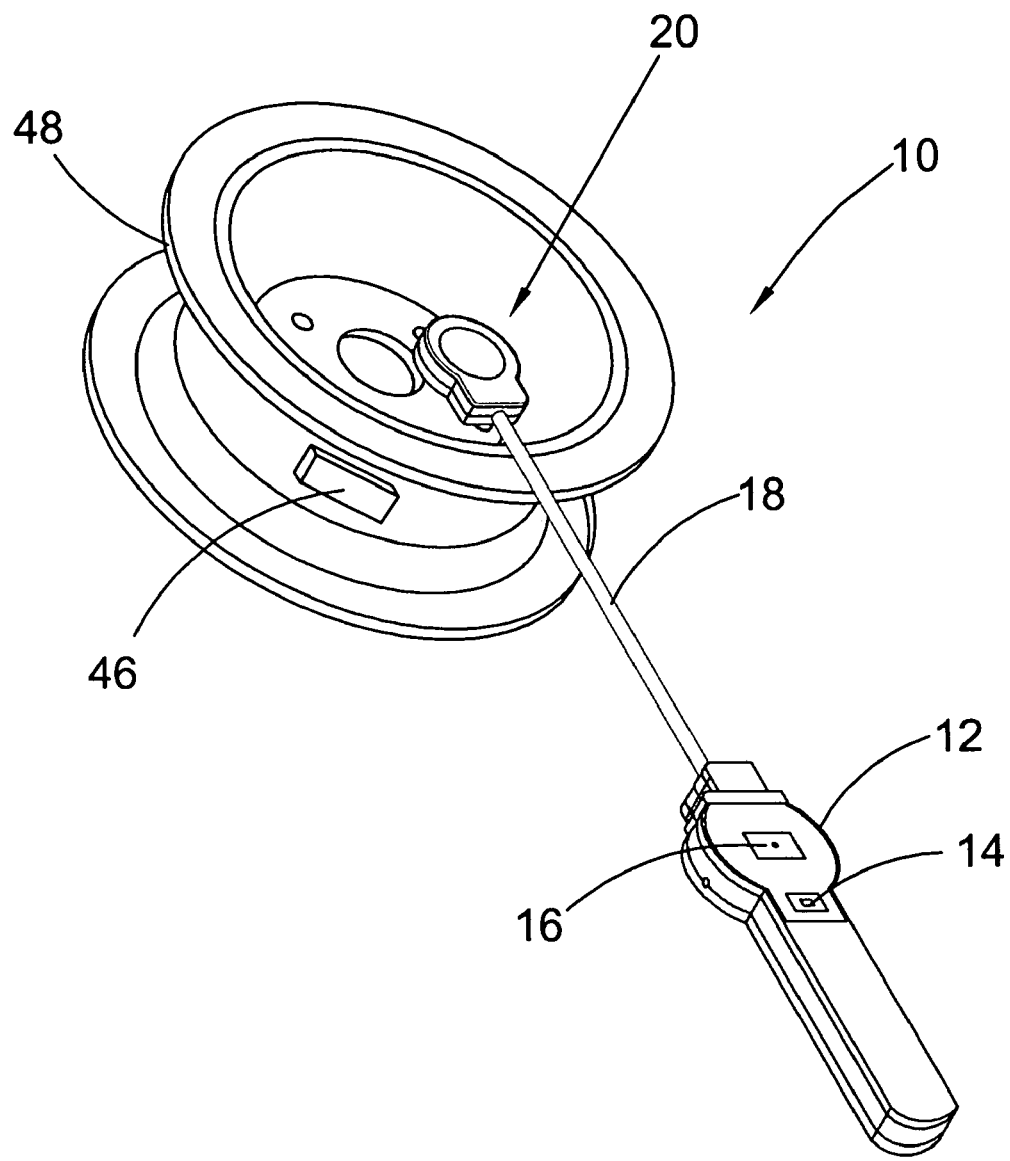
FIG. 15 is a perspective view of a handheld tire sensor communication device of the present invention in use.

As will be described hereinafter, the device 10 of the present invention is used to selectively communicate and interact with a tire sensor 46 as shown in FIGS. 13–15. The tire sensor 46 selectively senses at least one of tire temperature and tire pressure of the tire in which the sensor is at least one of contained therein or positioned adjacently thereto. The device allows a user that is outside the car to position the device around each respective tire an obtain information thereabout. The information is then displayed on the display screen 16 for viewing and analysis by a user. Upon analyzing the displayed data the user can pursue a course of action such as changing a tire or rotating a tire.

Figure 2:
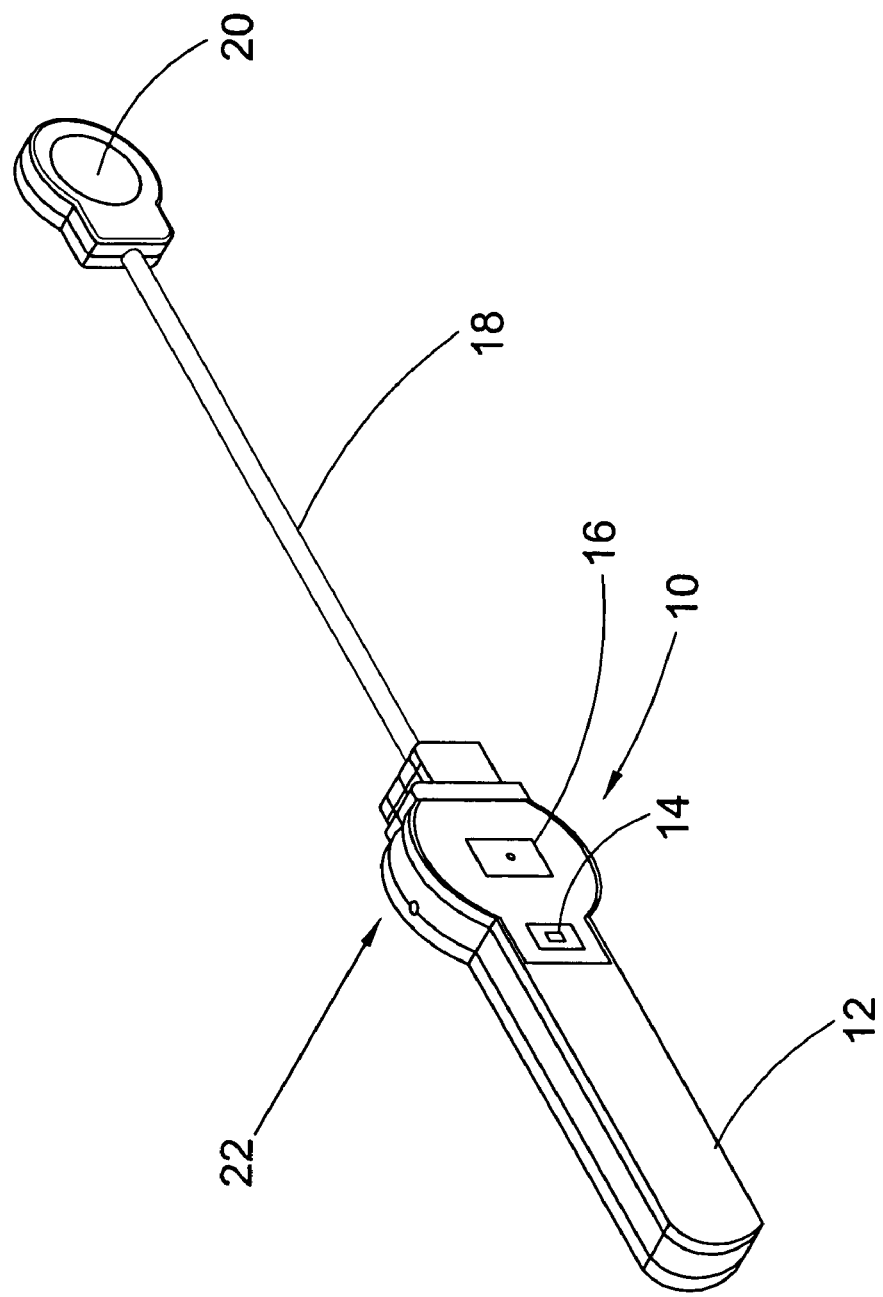
FIG. 2 is a rear perspective view of a handheld tire sensor communication device of the present invention.

FIG. 2 is a rear perspective view of a handheld tire sensor communication device of the present invention. The device includes the handle housing 12 having the extension tube 18 extending from an end thereof. The remote housing 20 is connected at an end of the extension tube 18 opposite the handle housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display. The device 10 further includes an external power port 22 for selectively connecting an external power source to the device 10 for providing power thereto.

The housing 12 includes circuitry for communicating with the tire sensor 46 as shown in FIGS. 13–15 and the remote housing 20 includes a transceiver mechanism positioned therein. The circuitry in the housing 12 is connected via connection wires which pass through the extension tube 18 for connecting the transceiver mechanism thereto. The at least one input button 14 selectively activates the circuitry to at least one of send and receive a signal via the transceiver mechanism in the remote housing 20. Should the circuitry determine that a signal is to be received, the data contained in the received signal is displayed on the display screen 16.

Figure 3:
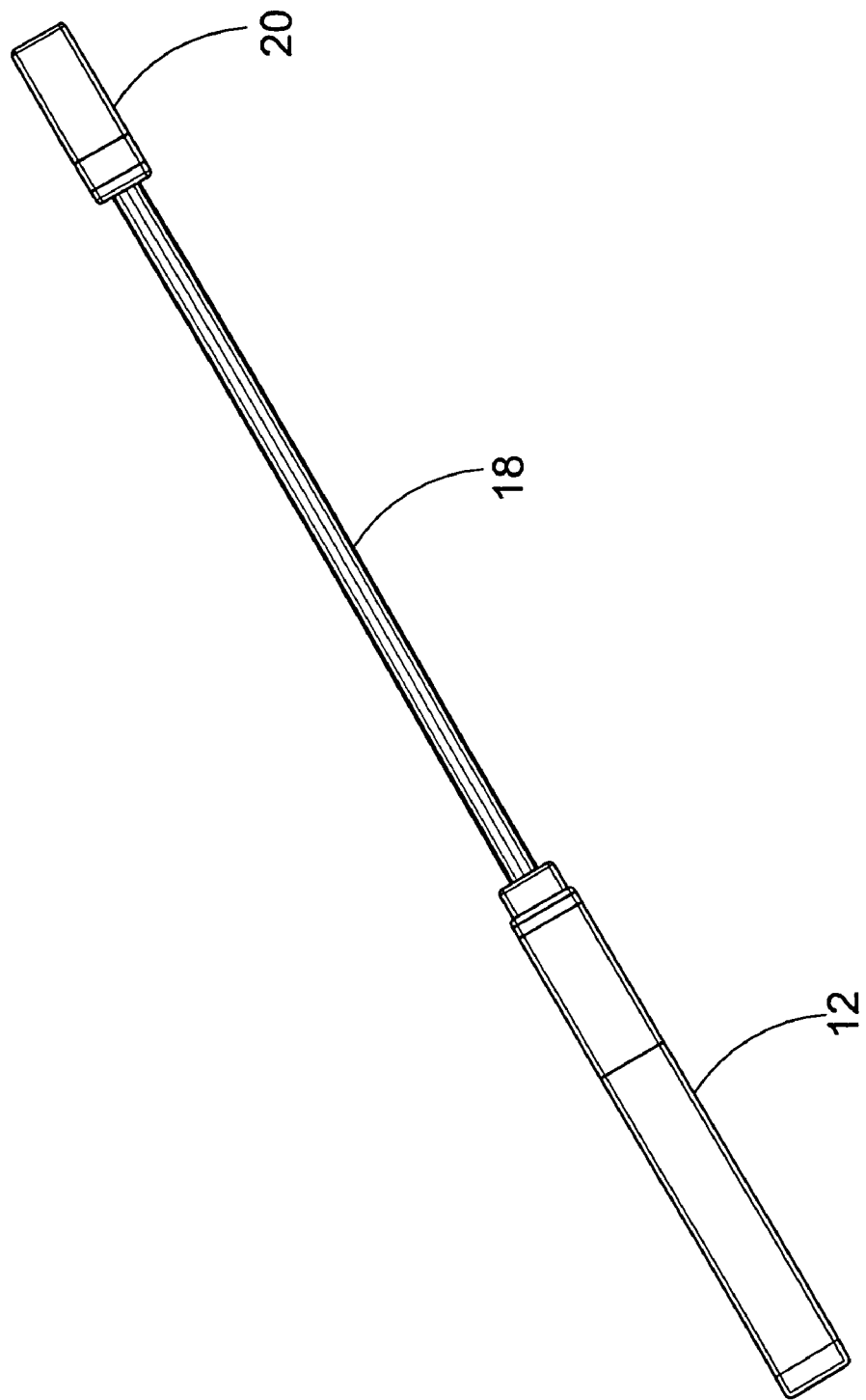
FIG. 3 is a side perspective view of a handheld tire sensor communication device of the present invention.

FIG. 3 is a side perspective view of a handheld tire sensor communication device of the present invention. The device includes the handle housing 12 having the extension tube 18 extending from an end thereof. The remote housing 20 is connected at an end of the extension tube 18 opposite the handle housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display.

Figure 4:
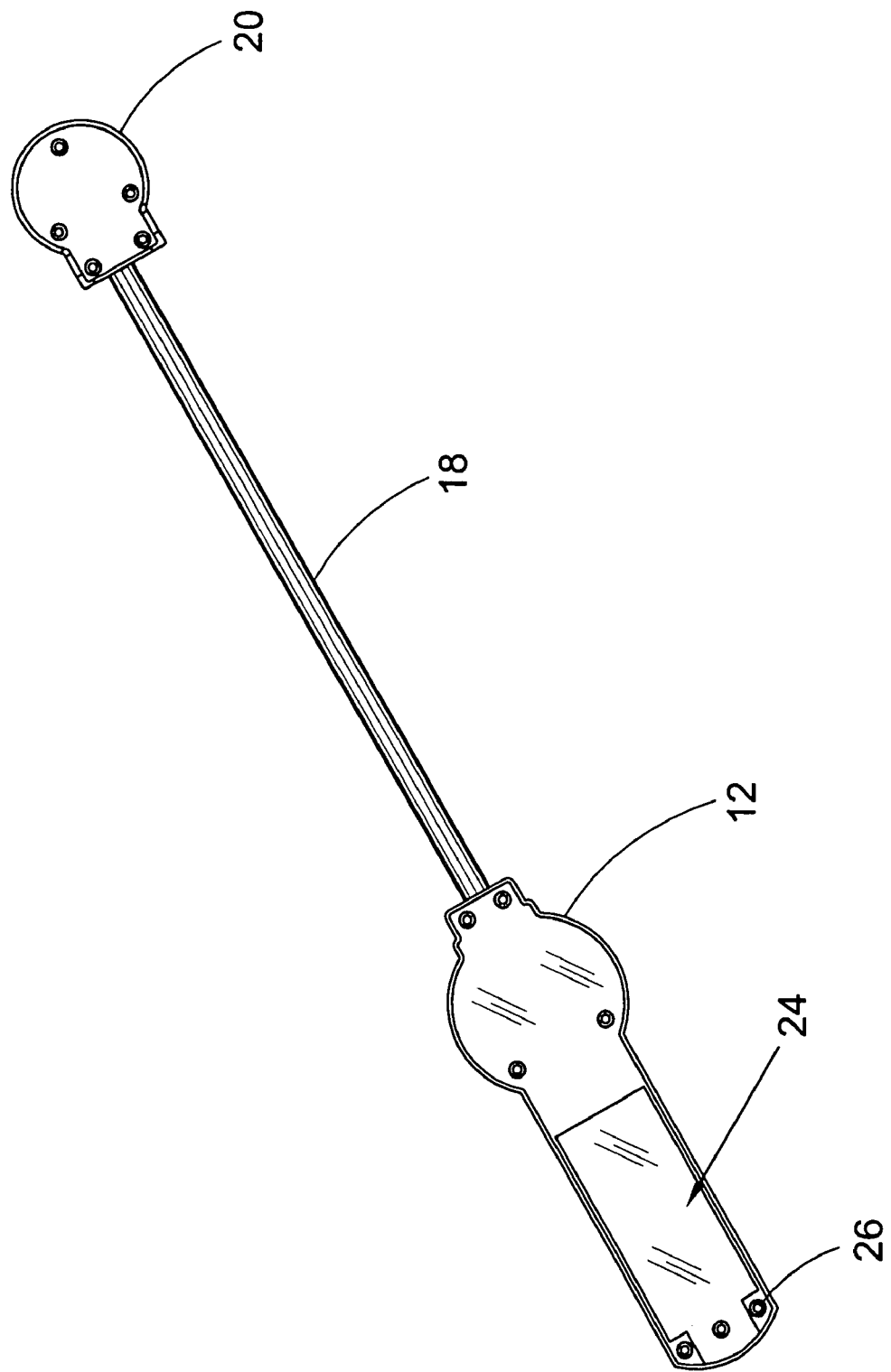
FIG. 4 is a rear view of a handheld tire sensor communication device of the present invention.

FIG. 4 is a rear view of a handheld tire sensor communication device of the present invention. The device includes the handle housing 12 having the extension tube 18 extending from an end thereof. The remote housing 20 is connected at an end of the extension tube 18 opposite the handle housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display. The device 10 of the present invention further includes a portable power source such batteries. The batteries are inserted and received within the battery compartment 28, as shown hereinafter with specific reference to FIG. 8. The battery compartment 28 is sealed by the compartment cover 24 which is releaseably fastened to the housing 12 via at least one fastener 26 or by snap fit means. The compartment 28 and cover 24 are positioned on a side of the housing 12 opposite the at least one input 14 and display screen 16.

Figure 5:
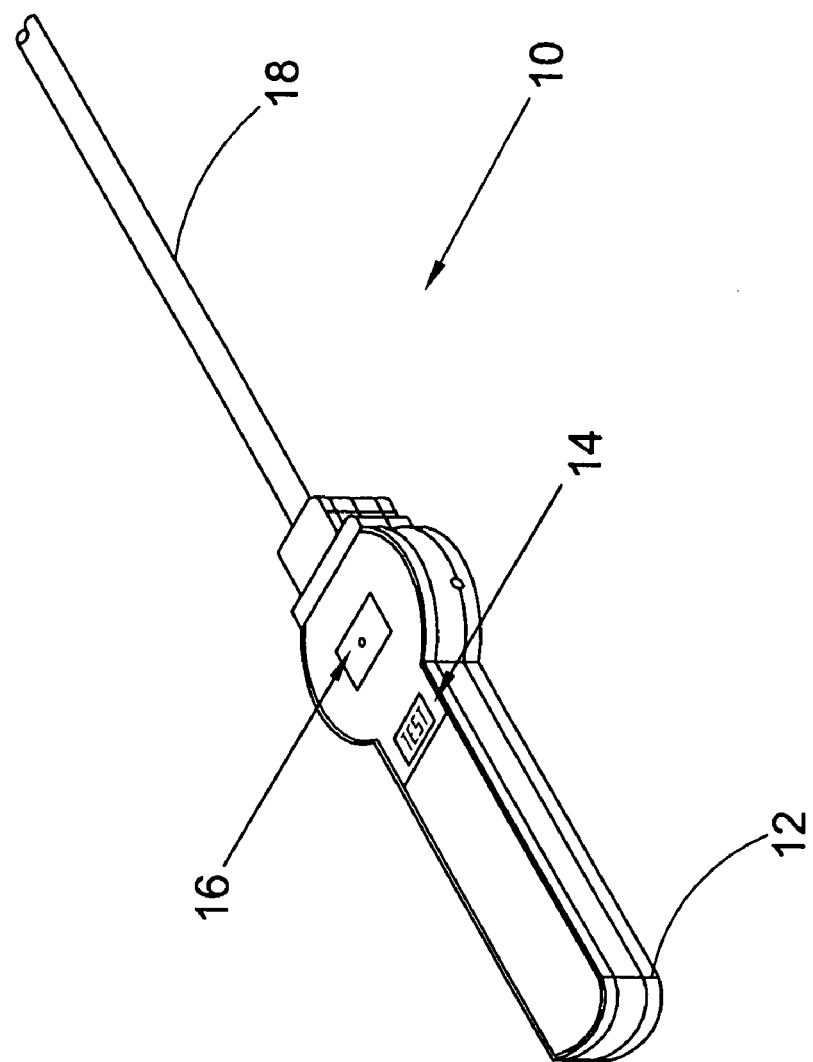
FIG. 5 is a perspective view of a handheld tire sensor communication device of the present invention.

FIG. 5 is a perspective view of a handheld tire sensor communication device of the present invention. The device includes the handle housing 12 having the extension tube 18 extending from an end thereof. The remote housing 20, as shown in FIGS. 1–3, is connected at an end of the extension tube 18 opposite the handle housing 12. The remote housing includes a transceiver mechanism therein. Alternatively, there need not be a remote housing and the transceiver mechanism may further be positioned within the housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display.

The device 10 of the present invention is selectively operable using the at least one input button 14 so that at least one of a tire pressure level and tire temperature level can be read by a user who is not positioned with the cab of the vehicle. The user is able to hold the device using the handle 12 and selectively position the device 10 with a predetermined distance from a tire having a tire sensor 46, as shown in FIGS. 13–15. The user depresses the at least on input button 14 and data sensed by the sensor 46 is transmitted to and received by the transceiver mechanism for display on the display screen 16. The device 10 is preferably a short range communication device and communicates at a frequency where the substantially emitted field is magnetic. This ensures that the device 10 is only communicating with the sensor 46 within the predetermined distance and thus is not transmitting data requests or instructions to sensors contained within the other tires of the vehicle. After reviewing the data on the screen 16, the user may selectively depress the at least one input button 14 which clears the received data from the device 16 readying the device to read data from a different tire.

Figure 6:
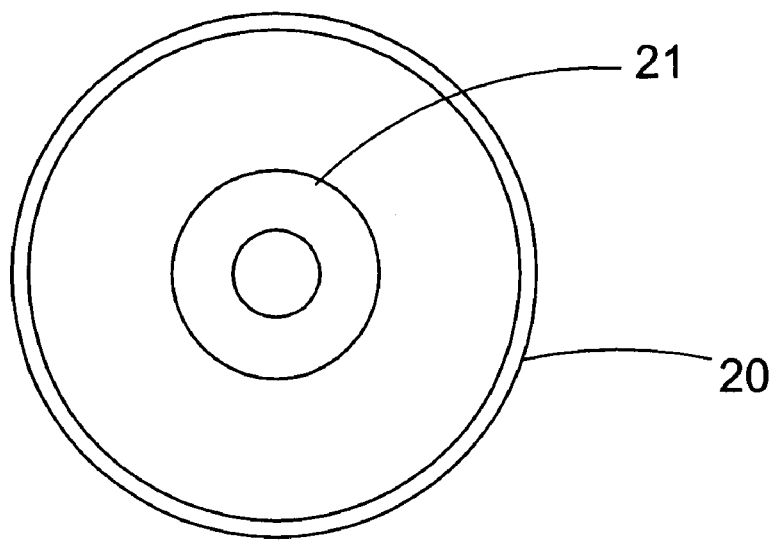
FIG. 6 is a front view of the remote housing of the handheld tire sensor communication device of the present invention.

FIG. 6 is a front view of the remote housing of the handheld tire sensor communication device of the present invention. The remote housing 20 includes the transceiver mechanism 21 contained therein. The transceiver mechanism 21 is connected to device circuitry as will be described hereinafter with specific reference to FIG. 12. The transceiver 21 is able to selectively transmit and receive data signals using radio frequency at a rate of substantially 125 KHz thereby allowing for short-range communication with a sensor 46 as shown in FIGS. 13–15.

Figure 7:
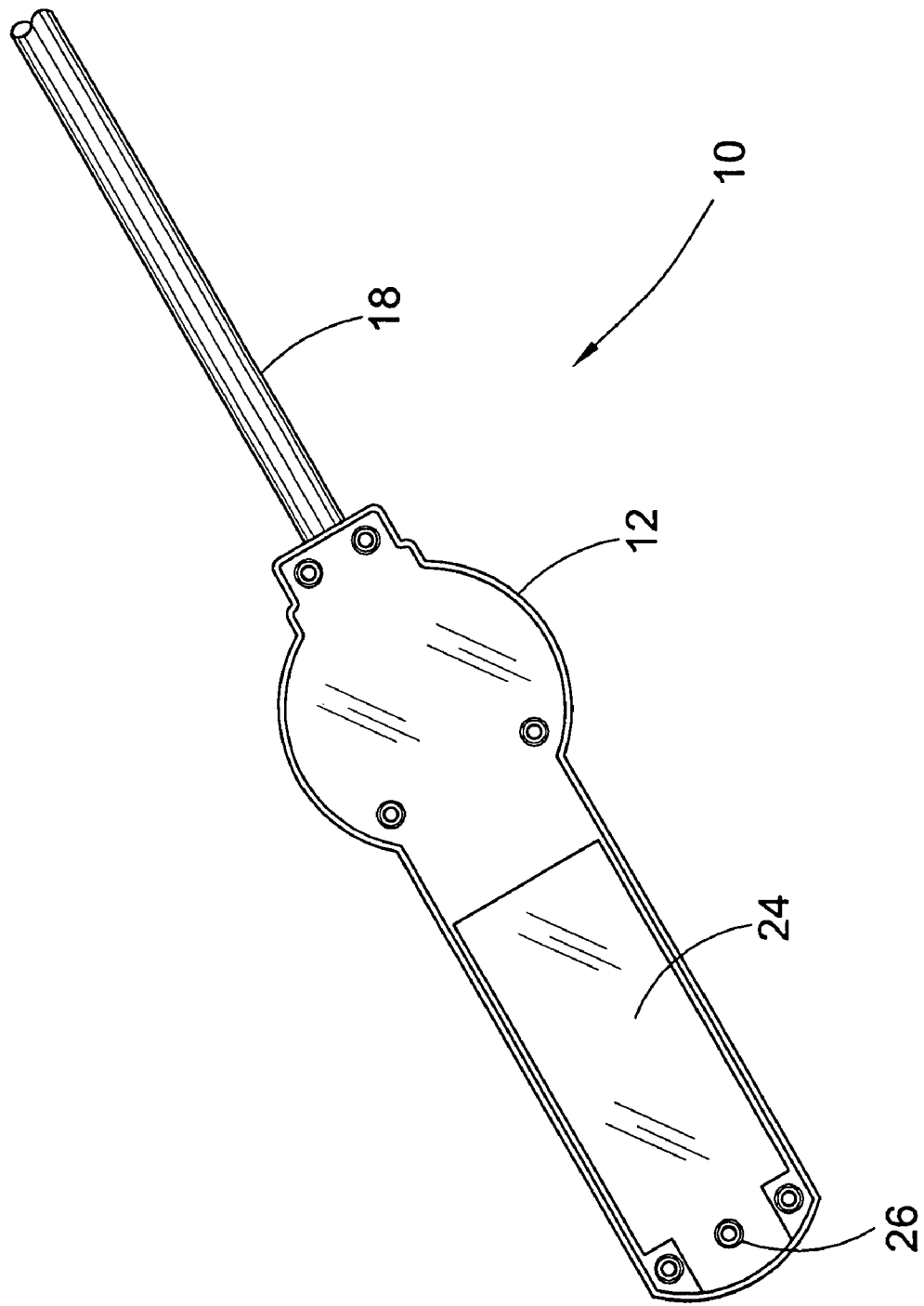
FIG. 7 is a rear view of a handheld tire sensor communication device of the present invention.

FIG. 7 is a rear view of a handheld tire sensor communication device of the present invention. The device includes the handle housing 12 having the extension tube 18 extending from an end thereof. The remote housing 20, as shown in FIGS. 1–3, is connected at an end of the extension tube 18 opposite the handle housing 12. The remote housing includes a transceiver mechanism therein. Alternatively, there need not be a remote housing and the transceiver mechanism may further be positioned within the housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display. The device 10 of the present invention further includes a portable power source such batteries. The batteries are inserted and received within the battery compartment 28, as shown hereinafter with specific reference to FIG. 8. The battery compartment 28 is sealed by the compartment cover 24 which is releaseably fastened to the housing 12 via at least one fastener 26 or by snap fit means. The compartment 28 and cover 24 are positioned on a side of the housing 12 opposite the at least one input 14 and display screen 16.

Figure 8:
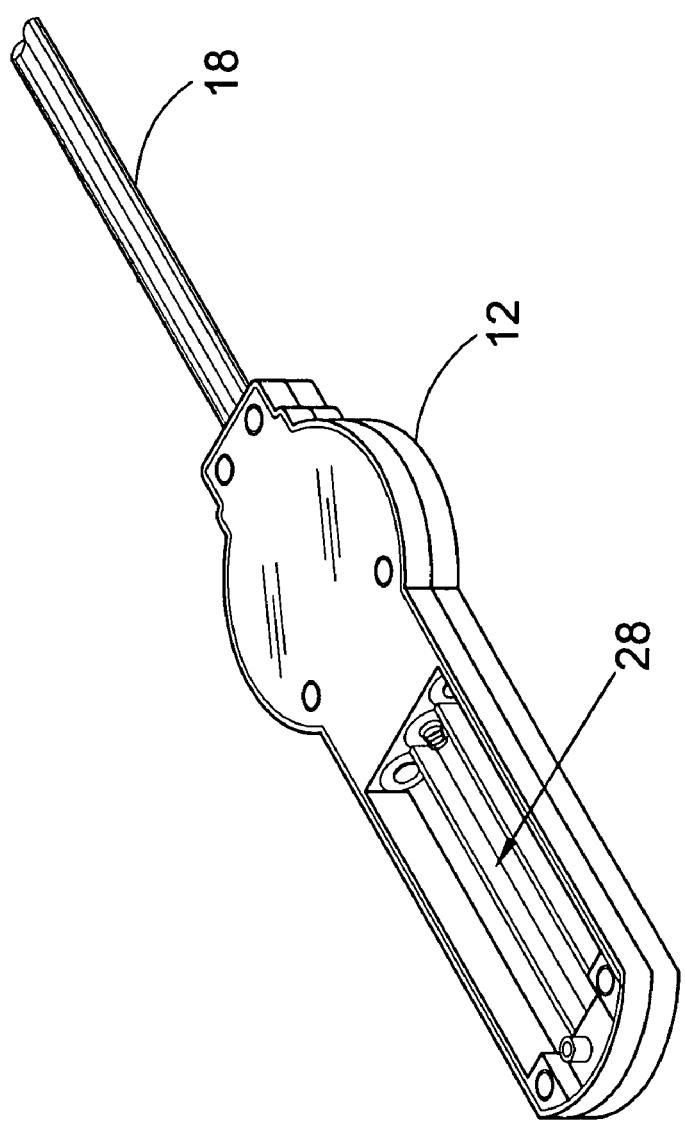
FIG. 8 is a rear view of a handheld tire sensor communication device of the present invention with the battery compartment exposed.

FIG. 8 is a rear view of a handheld tire sensor communication device of the present invention with the battery compartment exposed. The device includes the handle housing 12 having the extension tube 18 extending from an end thereof. The remote housing 20, as shown in FIGS. 1–3, is connected at an end of the extension tube 18 opposite the handle housing 12. The remote housing includes a transceiver mechanism therein. Alternatively, there need not be a remote housing and the transceiver mechanism may further be positioned within the housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display. The device 10 of the present invention further includes a portable power source such batteries. The batteries are inserted and received within the battery compartment 28. The battery compartment 28 is sealed by the compartment cover 24 which is releaseably fastened to the housing 12 via at least one fastener 26 as shown hereinabove with specific reference to FIG. 7; or by snap fit means. The compartment 28 and cover 24 are positioned on a side of the housing 12 opposite the at least one input 14 and display screen 16.

Figure 9:
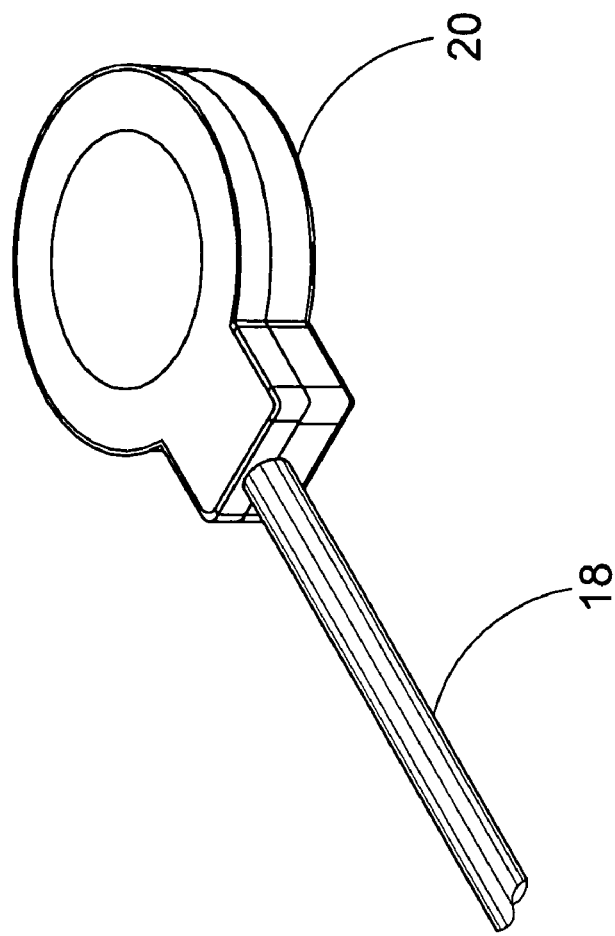
FIG. 9 is a perspective view of a handheld tire sensor communication device of the present invention.

FIG. 9 is a perspective view of a handheld tire sensor communication device of the present invention. The remote housing 20 of the device 10 is connected to the extension tube 18. The remote housing 20 includes the transceiver mechanism 21, as shown hereinabove with specific reference to FIG. 6. The transceiver mechanism 21 is connected via connection wires (not shown) which extend through the extension tube 18 to the device circuitry positioned within the handle housing 12. The length of the extension tube 18 may vary. Preferably, the extension tube 18 has a length ranging substantially between six inches and thirty-six inches. The extension tube 18 allows the device to act as a wand that can be selectively maneuvered and positioned around a mounted tire on a vehicle so that a data sensed by a sensor contained therein or positioned adjacent thereto may be obtained and viewed.

Figure 10:
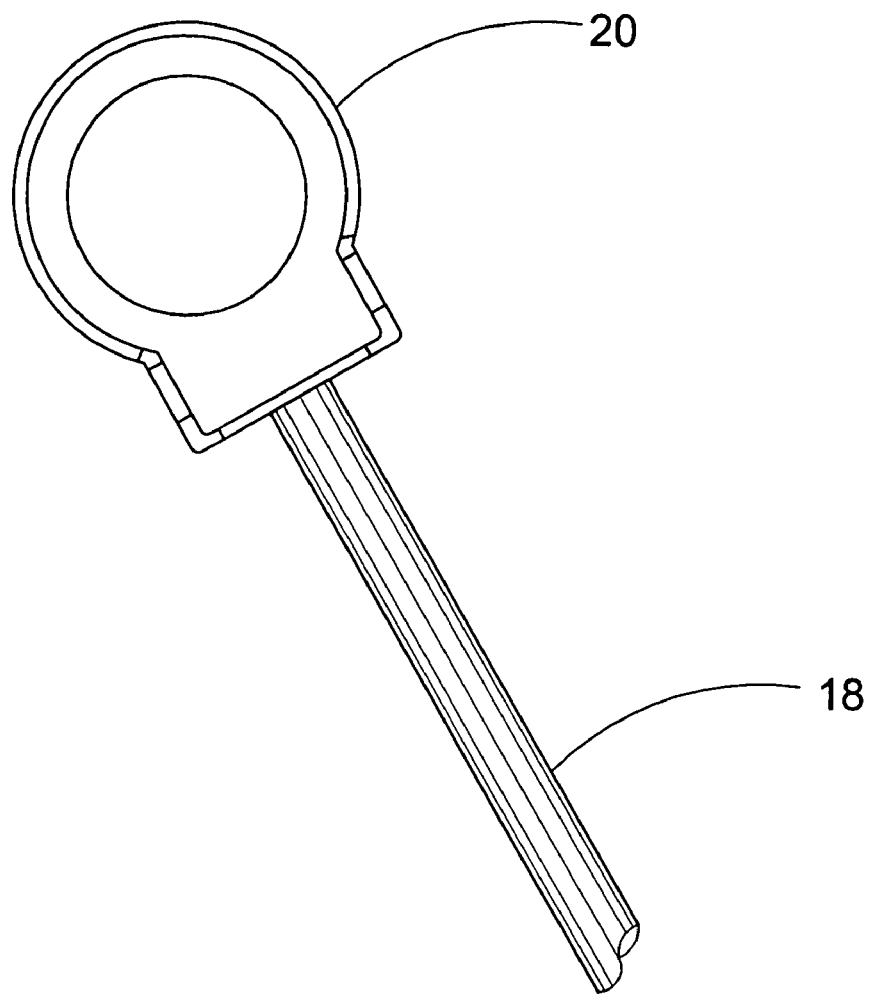
FIG. 10 is a front view of the remote housing of the handheld tire sensor communication device of the present invention.

FIG. 10 is a front view of the remote housing of the handheld tire sensor communication device of the present invention. The remote housing 20 of the device 10 is connected to the extension tube 18. The remote housing 20 includes the transceiver mechanism 21, as shown hereinabove with specific reference to FIG. 6. The transceiver mechanism 21 is connected via connection wires (not shown) which extend through the extension tube 18 to the device circuitry positioned within the handle housing 12. The length of the extension tube 18 may vary. Preferably, the extension tube 18 has a length ranging substantially between six inches and thirty-six inches. The extension tube 18 allows the device to act as a wand that can be selectively maneuvered and positioned around a mounted tire on a vehicle so that a data sensed by a sensor contained therein or positioned adjacent thereto may be obtained and viewed.

Figure 11:
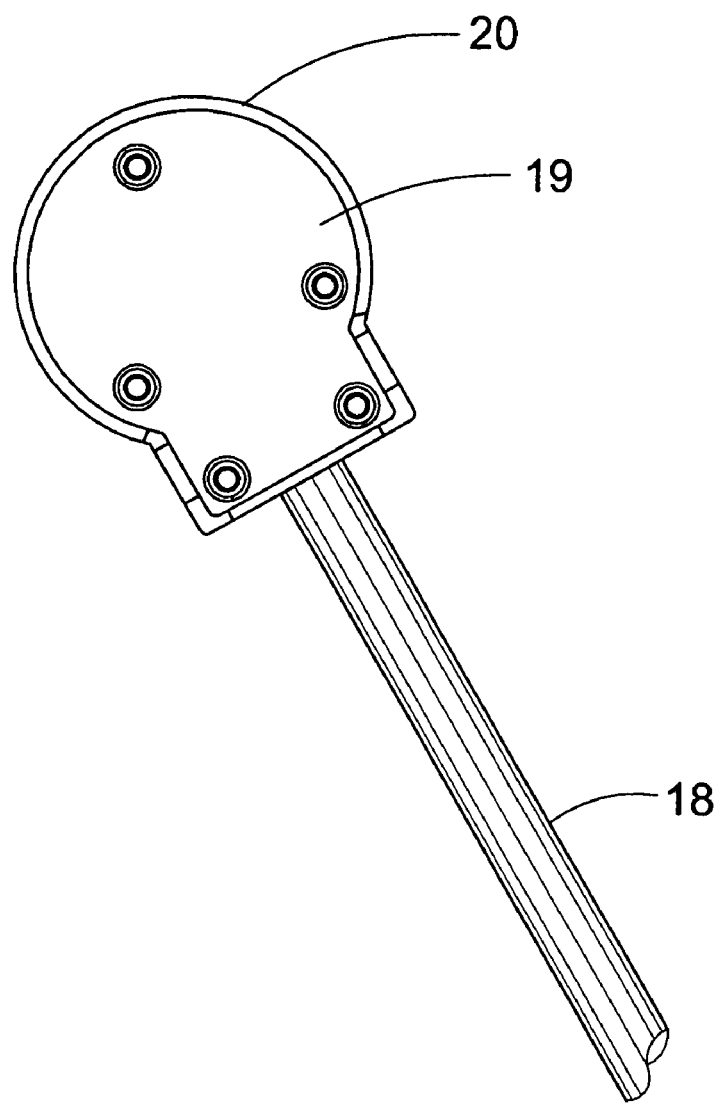
FIG. 11 is a rear view of the remote housing of the handheld tire sensor communication device of the present invention.

FIG. 11 is a rear view of the remote housing of the handheld tire sensor communication device of the present invention. The remote housing 20 of the device 10 is connected to the extension tube 18. The remote housing 20 includes the transceiver mechanism 21, as shown hereinabove with specific reference to FIG. 6 which is secured therein by a backing member 19. The transceiver mechanism 21 is connected via connection wires (not shown) which extend through the extension tube 18 to the device circuitry positioned within the handle housing 12. The length of the extension tube 18 may vary. Preferably, the extension tube 18 has a length ranging substantially between six inches and thirty-six inches. The extension tube 18 allows the device to act as a wand that can be selectively maneuvered and positioned around a mounted tire on a vehicle so that a data sensed by a sensor contained therein or positioned adjacent thereto may be obtained and viewed.

Figure 12A:
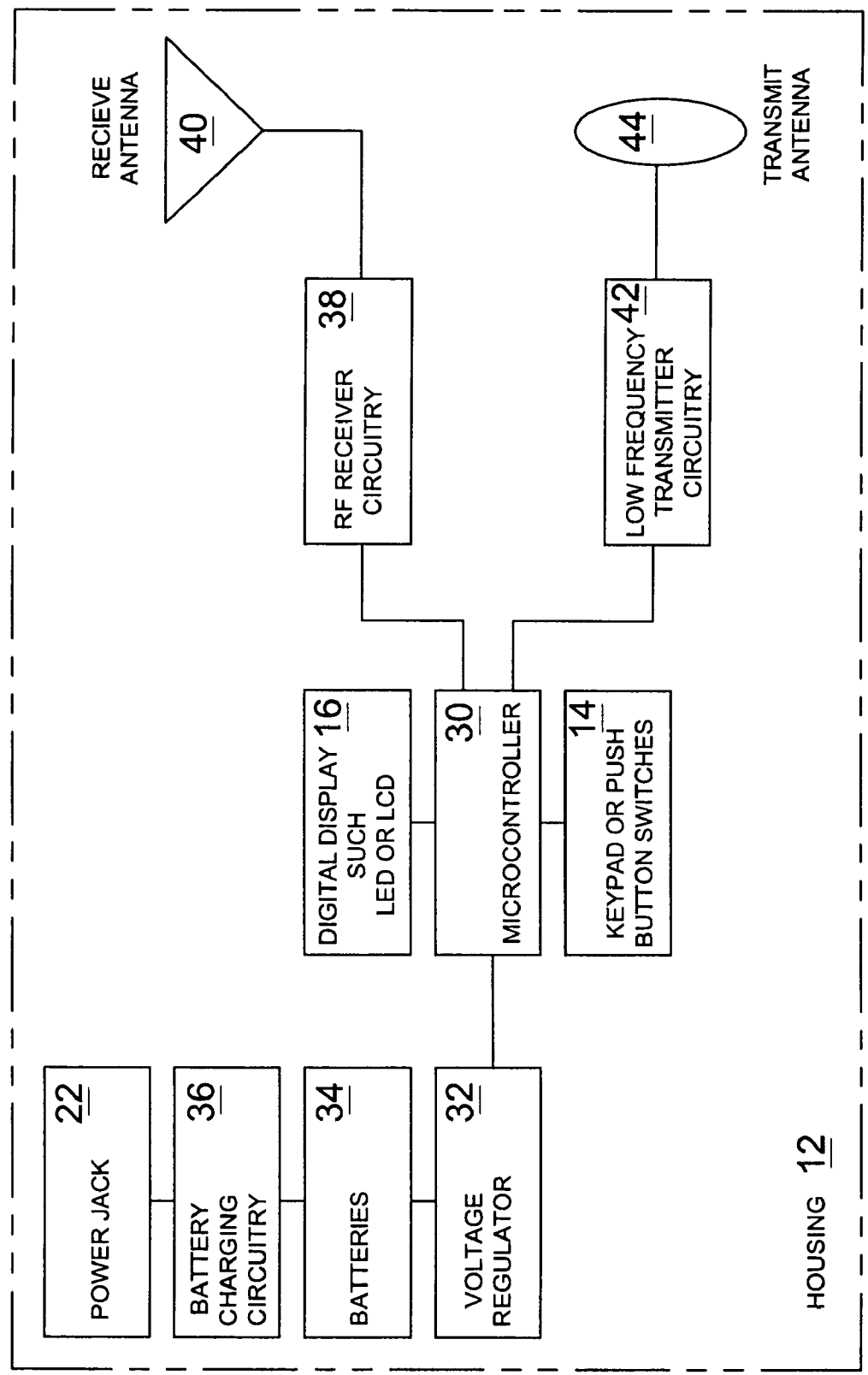
FIG. 12A is a block diagram of the handheld tire sensor communication device of the present invention in a single housing configuration.

FIG. 12A is a block diagram of a preferred configuration of the handheld tire sensor communication device of the present invention. The housing 12 includes both, the circuitry that directs operation of the device 10 of the present invention and the circuitry used in communicating with an external device such as the sensor positioned within or adjacent to a vehicle tire.

Figure 12B:
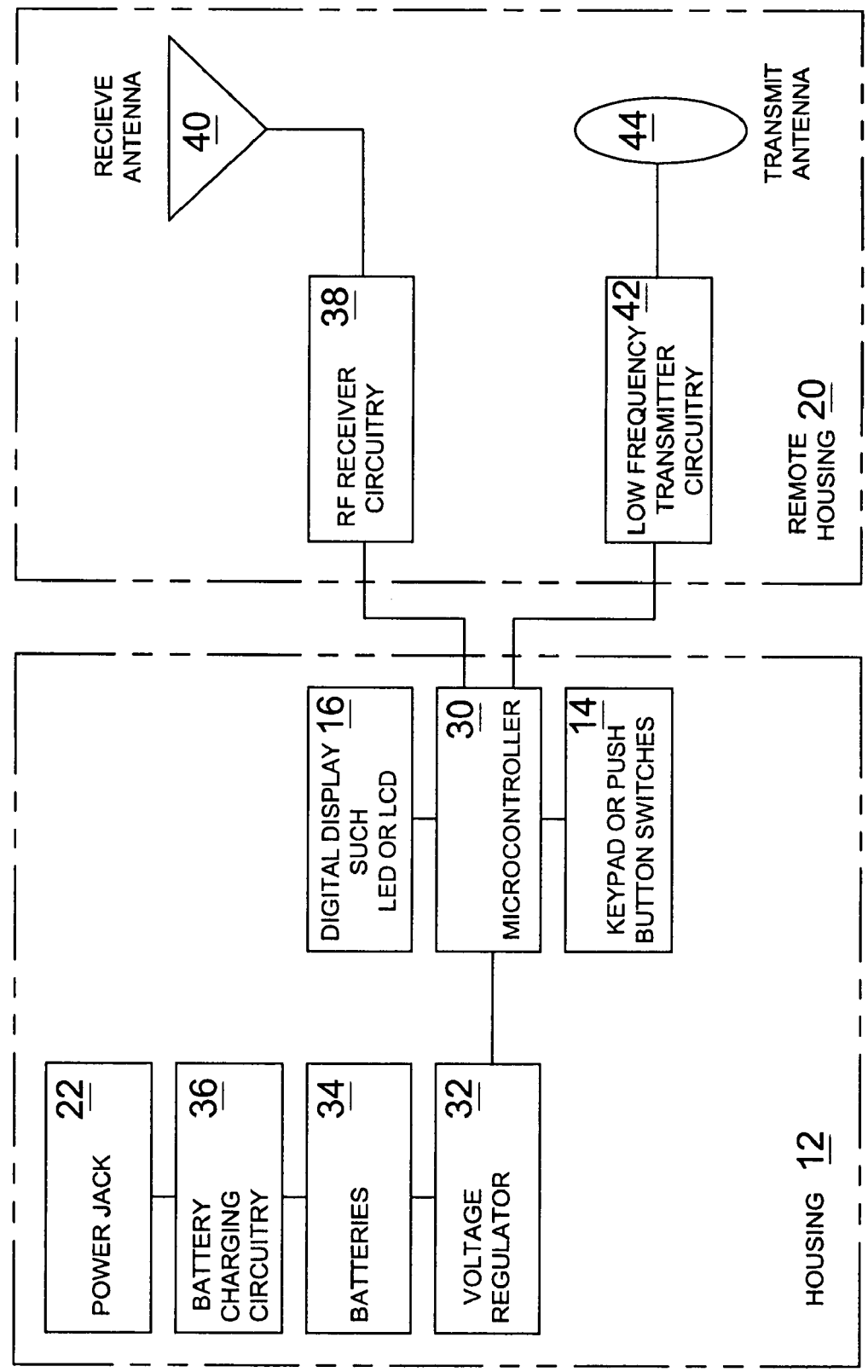
FIG. 12B is a block diagram of the handheld tire sensor communication device of the present invention in a hand held and remote housing configuration.

FIG. 12B is a block diagram of another preferred configuration of the handheld tire sensor communication device of the present invention. The housing 12 includes the circuitry that directs operation of the device 10 of the present invention and the remote housing includes the circuitry used in communicating with an external device such as the sensor positioned within or adjacent to a vehicle tire.

Figure 12C:
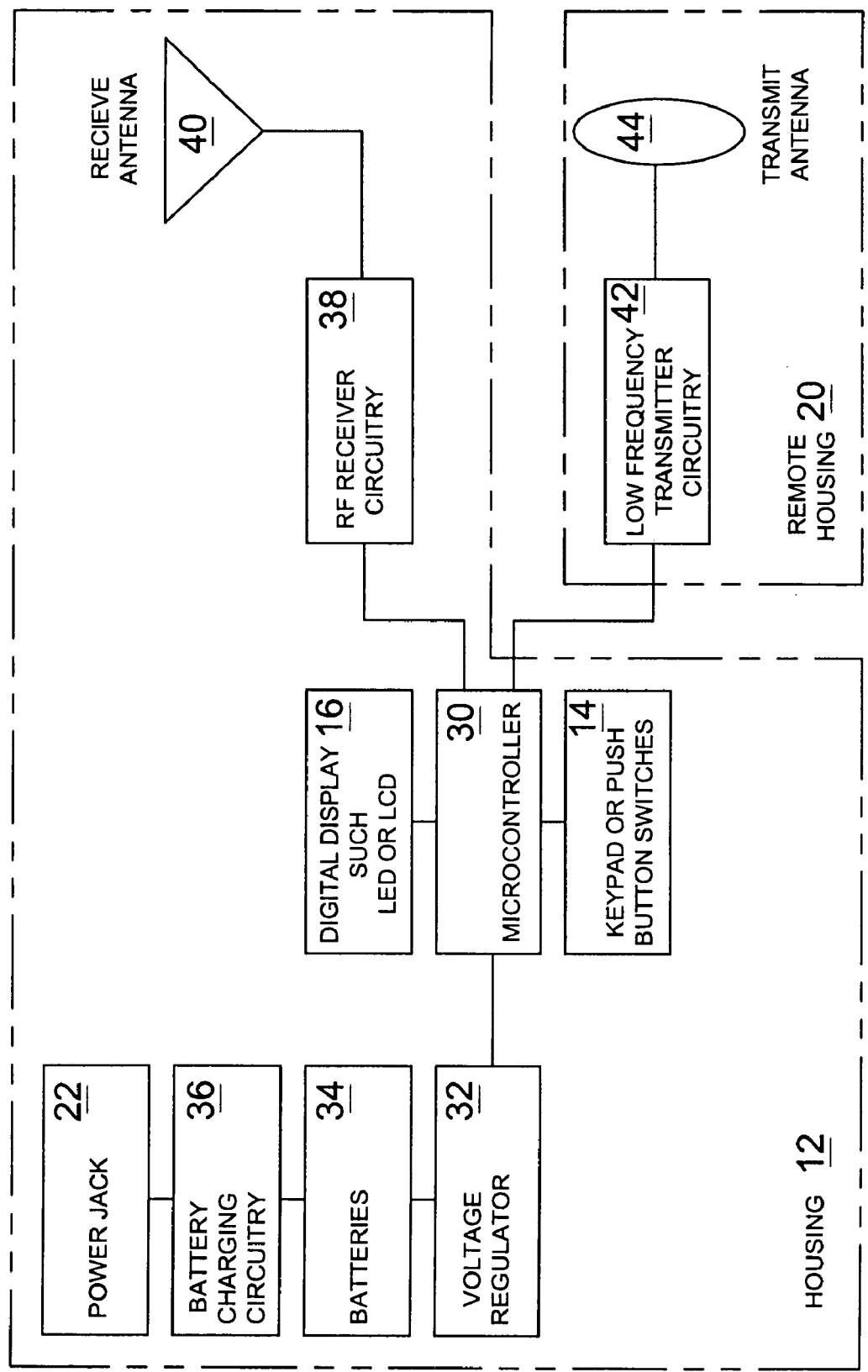
FIG. 12C is a block diagram of the handheld tire sensor communication device of the present invention in a hand held and remote housing configuration.

FIG. 12C is a block diagram of still another preferred configuration of the handheld tire sensor communication device of the present invention. The housing 12 includes the circuitry that directs operation of the device 10 of the present invention as well as the RF receiver circuitry and receiving antenna. The remote housing includes the transmitter circuitry and transmitter antenna.

The device circuitry includes a microcontroller 30 connected to each of the at least one input button 14 and the display screen 16. A voltage regulator 32 is connected between the microcontroller 30 and the batteries 34. The batteries 34, via the voltage regulator 32, provide the requisite power to the microcontroller 30 for powering the device 10 of the present invention. A battery charging circuit 36 is connected to the batteries 34 which utilizes any external power provided from the power jack 22. Should the device 10 be connected to an external power source via jack 22, the voltage regulator ensures that the microcontroller 30 is not overloaded thereby causing an electrical malfunction.

The transceiver mechanism 21 includes an RF receiver 38 connected to a first antenna 40. The transceiver mechanism also includes a low frequency transmitter 42 connected to a second antenna 44. The receiver 38 is able to selectively receive an RF signal via the first antenna 40. Any signal received by the receiver 38 is provided to the microcontroller 30 for interpretation thereof and display on display screen 16. At least one of in response to a received signal and prior to receipt of a signal, the at least one input button 14 causes the microcontroller 30 to provide transmitter 42 with at least one of an instruction signal and a request signal to be transmitted using the second antenna 44.

The request signal generated by the microcontroller 30 includes data that, when received by a sensor, causes the sensor to generate a data signal for transmission to and receipt by the receiver 38. The microcontroller 30 is also able to generate an instruction signal that includes data which when received by the sensor causes the sensor to adjust at least one pre-stored value therein.

FIG. 13 is a perspective view of a sensor that communicates with the handheld tire sensor communication device of the present invention. The device 10 as shown hereinabove with respect to FIGS. 1–12 is able to communicate with a sensor 46 positioned on a wheel drum 48. A tire (not shown) is positioned on the wheel drum 48 thereby enclosing the sensor 46 therein. Alternatively, the sensor 46 may be positioned within the tire itself and not on the wheel drum 48. The sensor 46 is able to sense a plurality of data values relating to the specific tire. These values include, but are not limited to, tire pressure, internal tire temperature and external tire temperature. Additionally, the sensor 46 is able to provide self-diagnostic information such as sensor battery life and sensor status. Additionally, the sensor 46 is selectively programmable to have a unique vehicle ID number assigned thereto which can be changed as needed. Also, the sensor 46 is able to store positional data relating to the position of the tire in relation to the vehicle such as data identifying the sensor as being in "a left front position" which means the sensor is sensing data corresponding to the left front tire. Also, the positional data may be selectively changed using the device 10.

FIG. 14 is a perspective view of a handheld tire sensor communication device of the present invention in use. The device includes the handle housing 12 having the extension tube 18 extending from an end thereof. The remote housing 20 is connected at an end of the extension tube 18 opposite the handle housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display.

A tire is positioned on the wheel drum 48 thereby enclosing the sensor 46 therein. Alternatively, the sensor 46 may be positioned within the tire itself and not on the wheel drum 48. The sensor 46 is able to sense a plurality of data values relating to the specific tire.

Shown herein, the device 10 is selectively positioned about a face of the tire and wheel drum 48. The user depresses the at least one input button 14 which generates at least one of a request signal and an instruction signal which is transmitted via the transceiver mechanism 21 for receipt by the sensor 46. The sensor 46 then transmits a data signal having at least one of the plurality of sensed data for receipt by the transceiver mechanism 21. The received data signal is the provided for viewing an analysis on the display screen 16. If the signal transmitted by the device 10 to the sensor 46 is an instruction signal, the data contained therein is provided to the sensor and changes a corresponding value stored within the sensor.

FIG. 15 is a perspective view of a handheld tire sensor communication device of the present invention in use. The device includes the handle housing 12 having the extension tube 18 extending from an end thereof. The remote housing 20 is connected at an end of the extension tube 18 opposite the handle housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display.

A tire is positioned on the wheel drum 48 thereby enclosing the sensor 46 therein. Alternatively, the sensor 46 may be positioned within the tire itself and not on the wheel drum 48. The sensor 46 is able to sense a plurality of data values relating to the specific tire.

Shown herein, the device 10 is selectively positioned about a face of the tire and wheel drum 48. The user depresses the at least one input button 14 which generates at least one of a request signal and an instruction signal which is transmitted via the transceiver mechanism 21 for receipt by the sensor 46. The sensor 46 then transmits a data signal having at least one of the plurality of sensed data for receipt by the transceiver mechanism 21. The received data signal is the provided for viewing an analysis on the display screen 16. If the signal transmitted by the device 10 to the sensor 46 is an instruction signal, the data contained therein is provided to the sensor and changes a corresponding value stored within the sensor.

Figure 16:
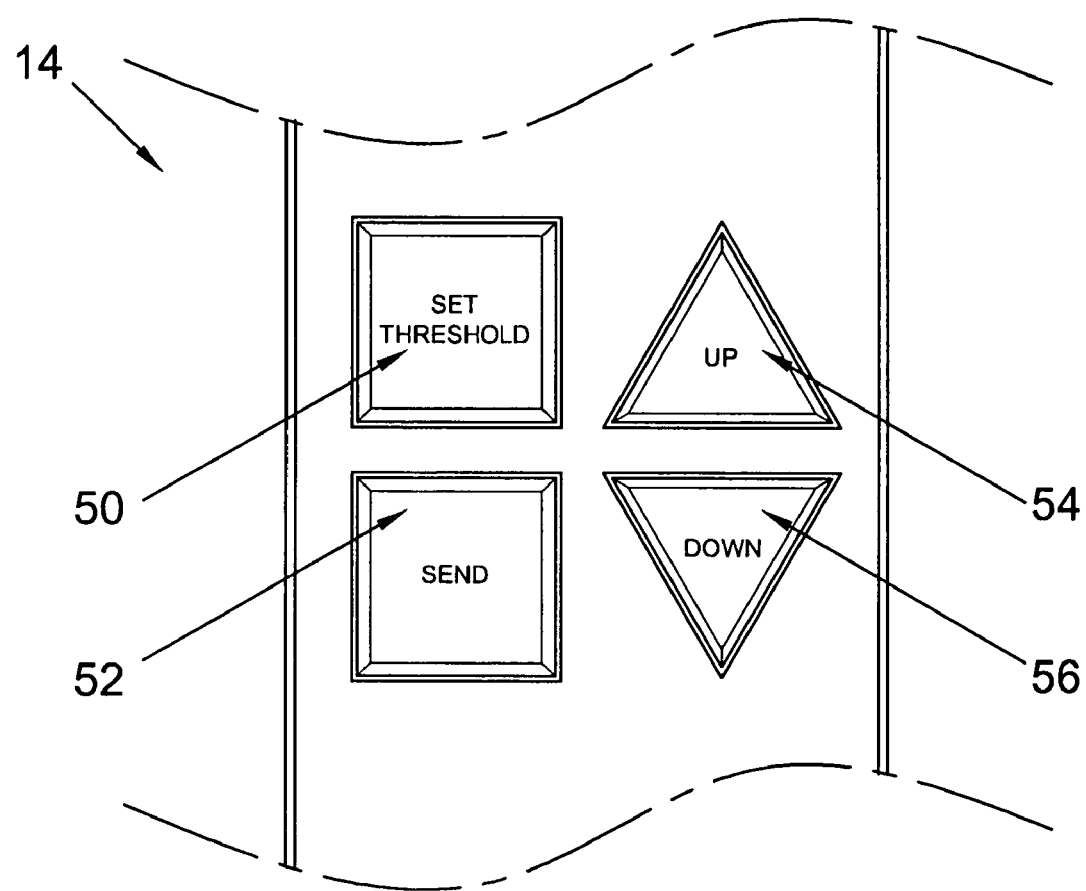
FIG. 16 is a detailed view of the input buttons of the handheld tire sensor communication device of the present invention.

FIG. 16 is a detailed view of the input buttons of the handheld tire sensor communication device of the present invention. The at least one input button 14 is shown herein and includes a plurality of buttons for different functions. Shown herein is a set button 50, a send button 52 and a increase value button 54 and a decrease value button 56. The user selectively depresses the set button 50 when a data value stored y the sensor 46 needs to be changed. If there are a plurality of stored values, then the user is able to serially depress the set button 50 until the desired value to be changed appears on the display screen 16. Alternatively, there can be a plurality of buttons for each respective stored data value. Upon determining which stored data value is to be changed, the device sends a request signal for receipt by the sensor and the sensor transmits a data signal having a data corresponding to the stored data value which is received by and displayed on the device. Thereafter, the user is able to toggle the increase button 54 and decrease button 56 to either increase or decrease the stored data value. When the user arrives at the desired new data value, the user depresses send button 52 which causes the device to generate and transmit an instruction signal having the new data value for receipt by the sensor. The sensor then changes the stored data value with the new data value contained in the instruction signal.

This method allows for the user to change any number of data values stored including threshold values for tire temperature and pressure. The threshold values are necessary to provide warning to a user that the pressure and/or temperature is at least one of too great or too low.

Figure 17:
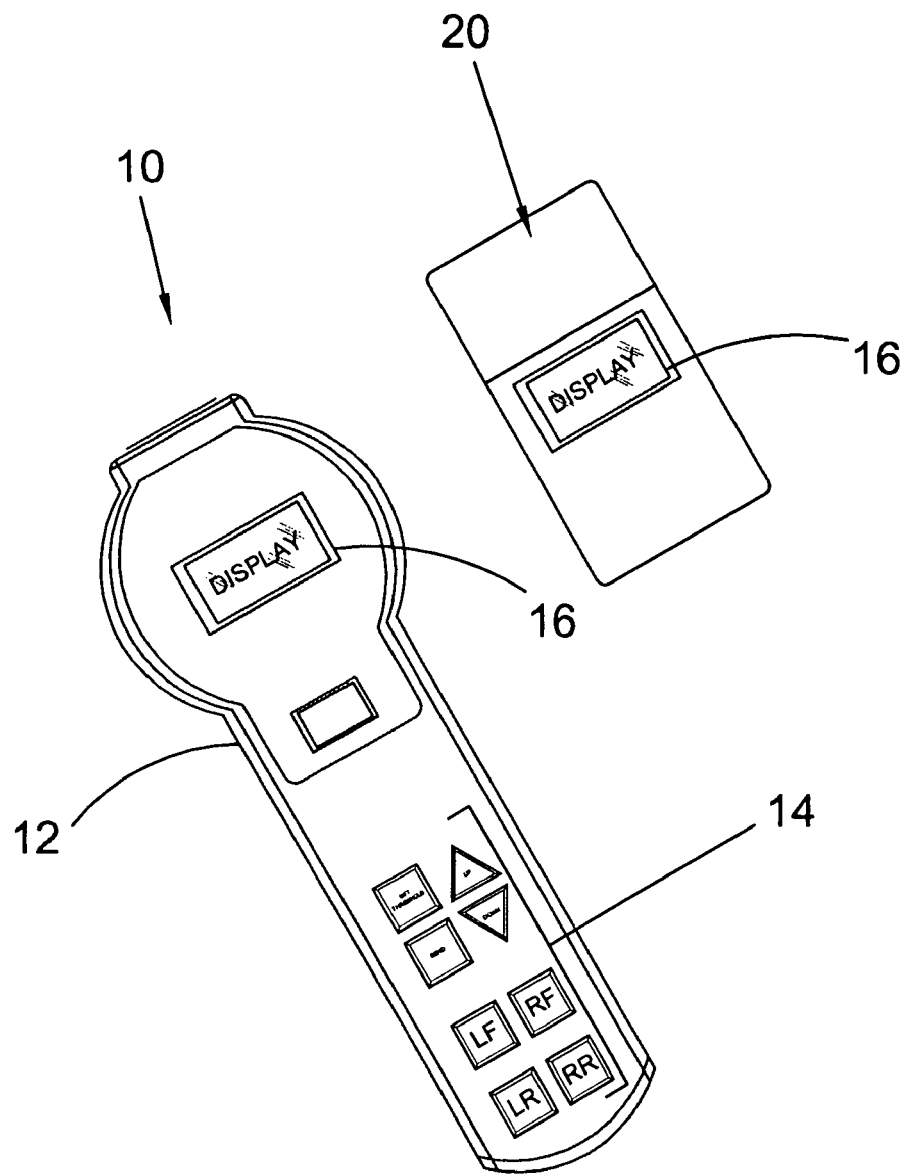
FIG. 17 is a front view of a handheld tire sensor communication device of the present invention.

FIG. 17 is a front view of a handheld tire sensor communication device of the present invention. The device includes the handle housing 12 including the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display. The remote housing 20 is shown as external from the handle housing 12 and further includes a display screen 23 for displaying data thereon.

Figure 18:
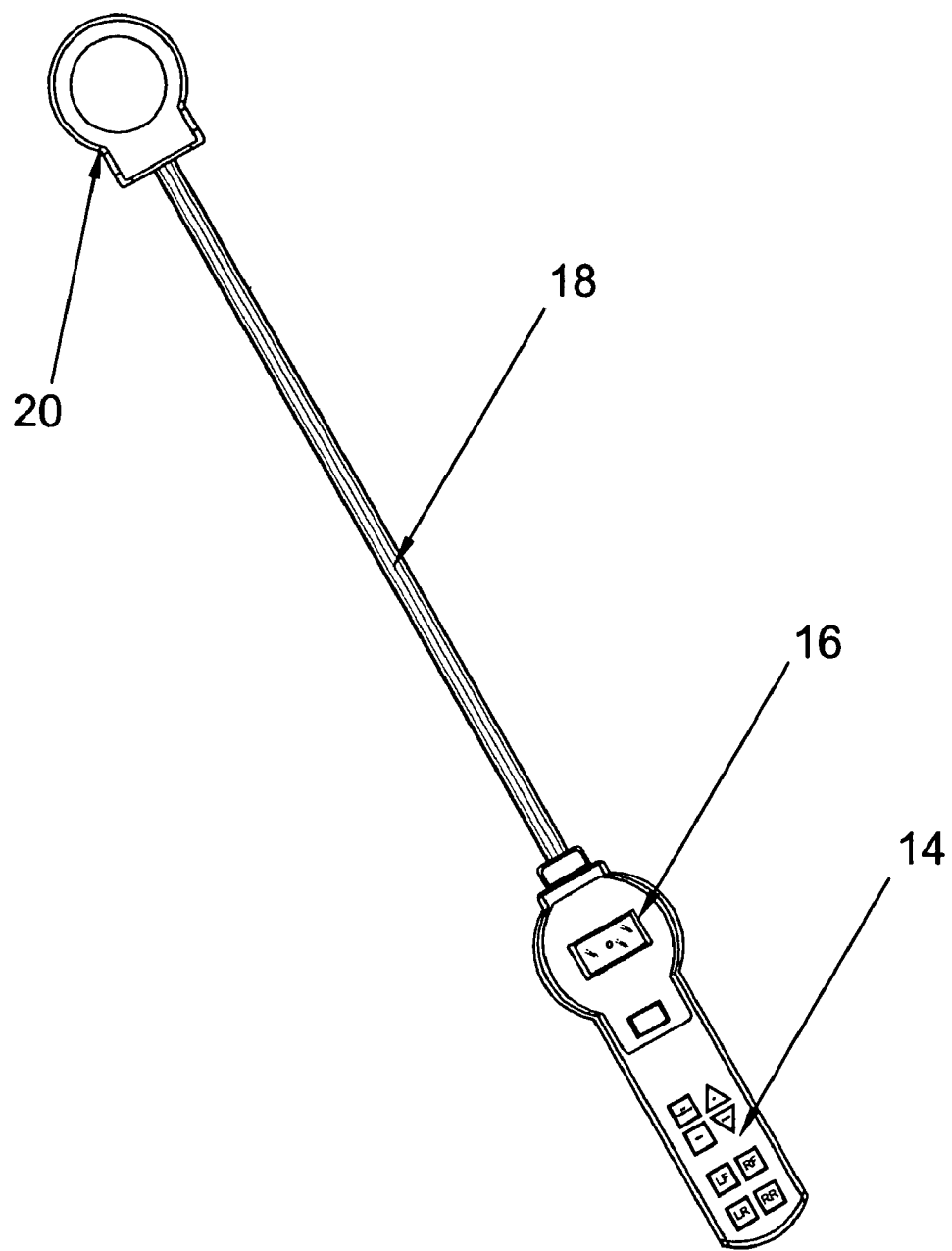
FIG. 18 is a front view of a handheld tire sensor communication device of the present invention.

FIG. 18 is a front view of a handheld tire sensor communication device of the present invention. The device includes the handle housing 12 having the extension tube 18 extending from an end thereof. The remote housing 20 is connected at an end of the extension tube 18 opposite the handle housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display.

Figure 19:
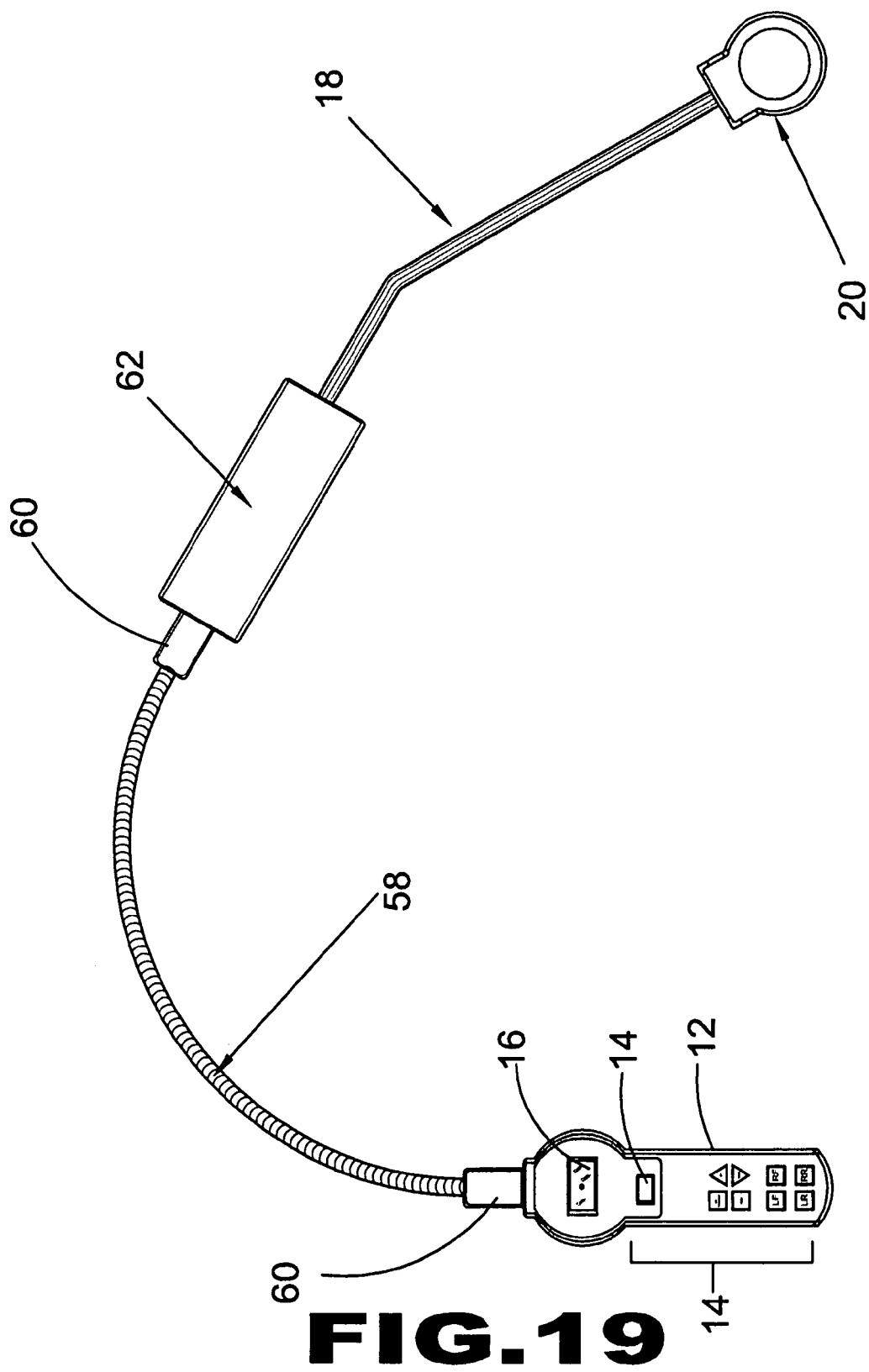
FIG. 19 is a perspective view of a handheld tire sensor communication device of the present invention.

FIG. 19 is a perspective view of a handheld tire sensor communication device of the present invention. The device includes the handle housing 12 having the extension tube 18 extending from an end thereof. The remote housing 20 is connected at an end of the extension tube 18 opposite the handle housing 12. The handle housing 12 further includes the at least one input button 14 for operation of the device 10 of the present invention. Also positioned on the handle housing 12 is the display screen 16 for displaying data thereon. The display screen 16 is at least one of a liquid crystal display (LCD) and a light emitting diode (LED) display.

Shown herein, the device 10 includes an extender member 58 which is preferably a flexible and maneuverable member. The extender member 60 is connected via connector 60 to each of the handle housing 12 and an auxiliary handle 62. The extension tube 18 is connected to the auxiliary handle 62 at an end opposite one of the connectors 60. The extender member 58 and auxiliary handle 62 allow the user great flexibility in positioning the remote housing 20 of the device. This allows for data sensed by sensors positioned on internal tires, such as on a tractor trailer, to be read and analyzed.

Figure 20:
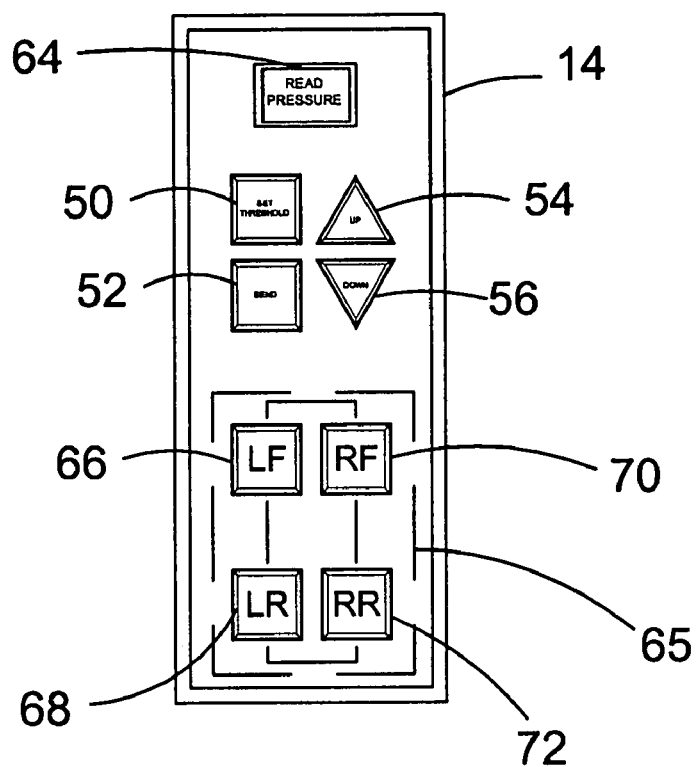
FIG. 20 is a detailed view of the input buttons of the handheld tire sensor communication device of the present invention.

FIG. 20 is a detailed view of the input buttons of the handheld tire sensor communication device of the present invention. The at least one input button 14 is shown herein and includes a plurality of buttons for different functions. Shown herein is a set button 50, a send button 52 and a increase value button 54 and a decrease value button 56. The user selectively depresses the set button 50 when a data value stored y the sensor 46 needs to be changed. If there are a plurality of stored values, then the user is able to serially depress the set button 50 until the desired value to be changed appears on the display screen 16. Alternatively, there can be a plurality of buttons for each respective stored data value. The input buttons 14 further include tire selector buttons 65. The tire selector buttons 65 include a first tire selector 66, a second tire selector 68, a third tire selector 70 and a fourth tire selector 72. Preferably, the buttons 65 correspond to a left front tire, a left rear tire, a right front tire and a right rear tire. The tire selector buttons 65 allows the user to selectively program the positional data stored by each sensor.

Figure 21:
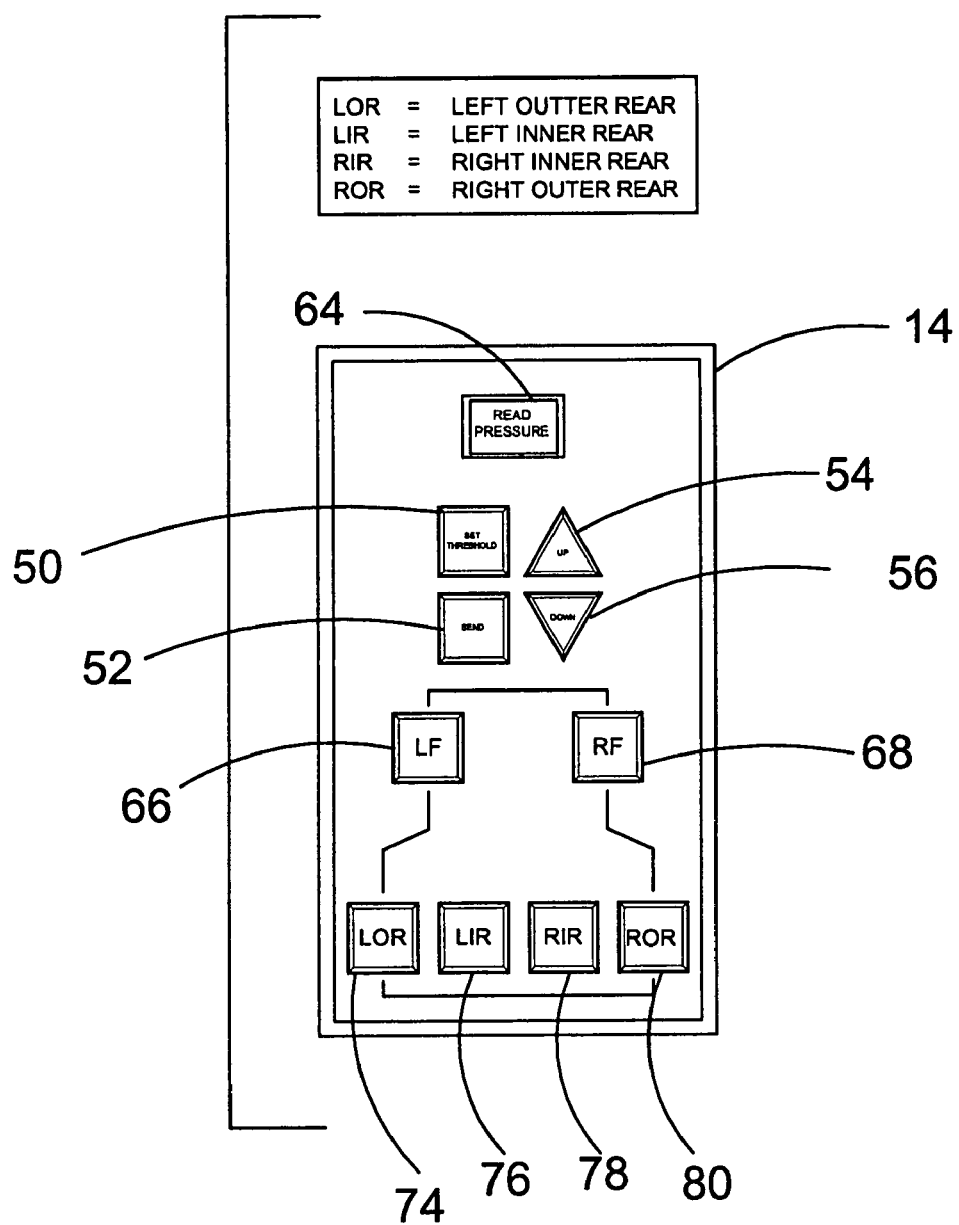
FIG. 21 is a detailed view of the input buttons of the handheld tire sensor communication device of the present invention.

FIG. 21 is a detailed view of the input buttons of the handheld tire sensor communication device of the present invention. The at least one input button 14 is shown herein and includes a plurality of buttons for different functions. Shown herein is a set button 50, a send button 52 and a increase value button 54 and a decrease value button 56. The user selectively depresses the set button 50 when a data value stored y the sensor 46 needs to be changed. If there are a plurality of stored values, then the user is able to serially depress the set button 50 until the desired value to be changed appears on the display screen 16. Alternatively, there can be a plurality of buttons for each respective stored data value. The input buttons 14 further a first tire selector 66 and a second tire selector 68. Also, the input buttons 14 include a first sub-tire selector 74, a second sub-tire selector 76, a third sub-tire selector 76 and a fourth sub-tire selector 76. Preferably, the buttons 65 correspond to a left front tire and a right front tire and the sub-tires correspond to a left outside tire, a left inside tire, a right inside tire and right outside tire. The tire selector buttons 65 allows the user to selectively program the positional data stored by each sensor and are useful specifically in relation to a pick up truck with dual tires or a semi cab.

Figure 22:
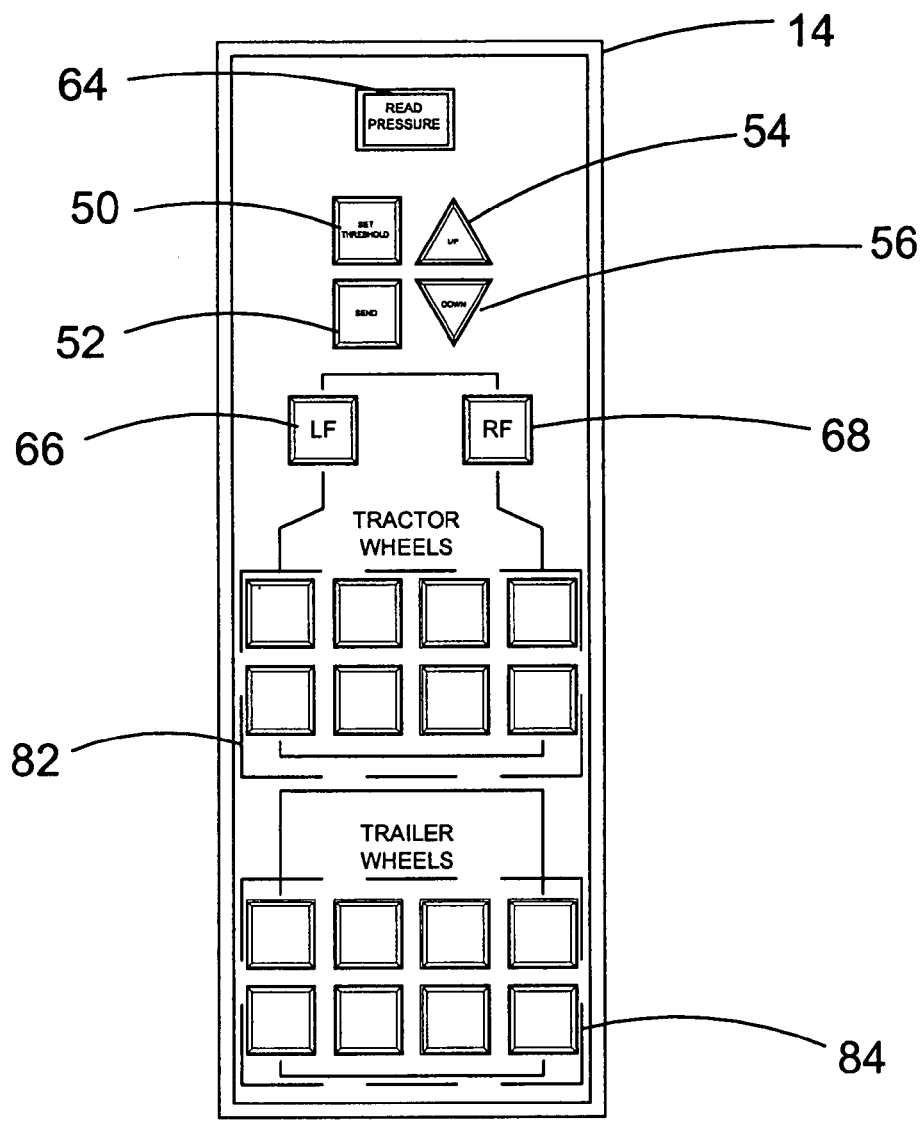
FIG. 22 is a detailed view of the input buttons of the handheld tire sensor communication device of the present invention.

FIG. 22 is a detailed view of the input buttons of the handheld tire sensor communication device of the present invention. The at least one input button 14 is shown herein and includes a plurality of buttons for different functions. Shown herein is a set button 50, a send button 52 and a increase value button 54 and a decrease value button 56. The user selectively depresses the set button 50 when a data value stored y the sensor 46 needs to be changed. If there are a plurality of stored values, then the user is able to serially depress the set button 50 until the desired value to be changed appears on the display screen 16. Alternatively, there can be a plurality of buttons for each respective stored data value. Shown herein, the input buttons includes a tractor wheel button 82 having a plurality of buttons corresponding to each tractor wheel and trailer wheel buttons 84 which correspond to each wheel on the trailer. This allows the user to selective obtain data regarding and program each respective wheel on the vehicle.

The operation of the device 10 of the present invention will be discussed hereinafter in view of FIGS. 1–22. The device 10 may be formed in a plurality of configurations. The device may include all electronic circuitry mounted in a single housing 12. Alternatively, microcontroller 30, batteries 34, display 16 and RF receiver 38 are mounted in the handle assembly 12 and the low frequency transmitting antenna 42 mounted at the end of the extension tube 18. A further embodiment includes an adjustable extension tube 18, such as a telescopic tube, to adjust the length of the tube 18 such that the user can adjust the length thereof based on their own requirements. Connection wires are routed through the hollow tube to provide for a means of electrical interconnect between the main electronics and the transceiver mechanism 21.

An additional embodiment includes microcontroller 30, batteries 34, display 16 and RF receiver 38 are mounted in the handle assembly and the low frequency transmitting antenna 44 and transmitter 42 positioned at the end of the extension tube 18 in a remote housing 20. The circuitry in the handle 12 and the remote housing 20 are connected via connection wires extending through the extension tube 18. These connection wires may be selectively disconnected from either housing 12, 20 so as to separate the device into two members. With this configuration, the user is able to hold the main electronics module in a position allowing easy reading of the display, while in the other hand holds the handle on the end of the tube that allows the low frequency antenna to be held in the proper position for communication with the tire mounted sensor/transmitter.

The transmitter antenna module if mounted remotely from the main electronics circuitry includes a low frequency transmitting antenna. Optionally, the low frequency transmitter circuitry may be placed in the antenna module as opposed to the hand held control unit.

Low frequency transmission, such as 125 KHz for example, is chosen due to its very short range of communication distance. This short-range communication prevents other sensor/transmitters on the vehicle from responding to a signal meant for a different sensor/transmitter. Since the distance of low frequency communication is substantially one foot, a sensor/transmitter mounted in the rear of the vehicle for example will not respond to a transmission targeted to a sensor/transmitter mounted at any other location on the vehicle. This is extremely important when using the hand held communication device on vehicles that employ dual wheel configurations. In these applications, it is critical that the sensor/transmitter on the inside of the dual wheel configuration does not respond when the hand held communication device is interrogating a sensor/transmitter mounted on the outside position of the dual wheel configuration.

The data signals transmitted by the tire-mounted sensor/transmitter are received by the receiver 38 and provided to the microcontroller 30 for interpretation thereof. The RF receiver 38 is compatible with a plurality of different sensors that may be installed on a vehicle. Additionally, the device 10 may include a programmable frequency feature such that the device 10 can be used with a wide variety of sensor/transmitters from a variety of manufacturers. Also, this RF receiver circuitry may include the necessary circuitry to receive a wide variety of modulation methods such as ASK and FSK.

In a simple device 10, the device 10 may provide one button or switch 14. This button/switch 14, when depressed causes a request signal to be generated by the device which is transmitted to a respective sensor and requests a data signal containing internal tire pressure and temperature information. Preferably, hand held communication device 10 includes a plurality of input buttons 14 able to activate a plurality of functions.

Additionally, the device 10 of the present invention is able to interact with a plurality of tire sensors wherein each sensor is programmed with each of a unique ID number and a positional data corresponding to the position on the tire on the vehicle. This data is stored by a vehicle receiver and is used to notify a user of the specific tire if a problem such as low pressure or increased temperature was to occur. A problem arises when the tires are rotated because the positional data for the tires is no longer accurate. The plurality of input buttons 14 can be used to re-associate the unique ID number with the correct positional data value in a vehicle receiver. An Example is shown below in Example 1.

EXAMPLE 1

This example relates to a vehicle having four tires listed below and stored in vehicle receiver as:

Left Front—ID #1234

Right Front—ID #1235

Left Rear—ID#1236

Right Rear—ID #1237

After a tire rotation, the actual IDs and corresponding positions may look as follows:

Left Front—ID#1236

Right Front—ID #1237

Left Rear—ID #1234

Right Rear—ID #1235

This clearly shows that the information stored in the vehicle's receiver no longer matches the actual IDs and corresponding positions of the tire mounted sensor/transmitters. Therefore, the device 10 of the present invention, using a plurality of inputs, is used to re-program the vehicle receiver of the new positions of the tire mounted sensor/transmitter modules. While the example discussed a 4-tire vehicle, this process could be followed on vehicles with 6 tires (1-ton pickups with duals, as an example) or on semi-tractor/trailer rigs with as many as 22 tires.

EXAMPLE #2

Example #1 clearly shows that the vehicle receiver's positional data as well as each tire sensor modules positional data is no longer valid after the vehicle's tires have been rotated.

This example illustrates how the hand held communication device can be used to update the vehicle receiver's positional data as well as the positional data stored within the tire sensor module's memory.

To reprogram the tire positional data within the vehicle receiver and the tire mounted sensor/transmitter modules, the user would place the handheld communication device adjacent to a respective tire as shown in FIG. 14. If the user had selected the left front (LF) tire position as example, he or she would depress the LF button on the handheld device. The handheld device would then transmit a low frequency message to the tire sensor module instructing it to update its positional data to LF—or Left Front. The tire sensor module would receive this low frequency transmitted instruction then update its stored data to reflect the LF position. Additionally, the tire sensor module would then generate a RF transmission similar in format defined in Table 3. This message would contain the new positional data as received by a low frequency transmission from the handheld device. Finally, the vehicle receiver module would receive this RF transmission and extract the transmitter ID data as well as the positional data. The vehicle receiver would then update its memory to associate this particular sensor module's ID with the new positional data LF. The hand held unit may also receive the RF transmission generated by the tire sensor module and display an acknowledgement on its display such as "OK"

This process would be repeated until all tires sensor modules on the vehicle have been updated to the correct positional data.

Once this process is complete, all tire sensor modules and the vehicle receiver module would contain the updated positional data.

Table 1, shows an example of various commands that could be transmitted from the handheld communication device 10 to the tire mounted sensor/transmitter's 46 response or action as well as the counter-action of the device 10.

TABLE 1

| Handheld Command | Action by tire mounted sensor/transmitter | Handheld Action |
| --- | --- | --- |
| Send tire pressure | Sends RF message with tire pressure data (temperature data could also be sent) | Receive RE transmission show pressure on display |
| Send tire temperature | Sends RF message with tire temperature data (tire pressure data could also be sent) | Receive RF transmission Show temperature on display |
| Update low pressure Threshold to value | low pressure threshold updated based on data contained in received low frequency message RE acknowledge message send | Receive RE transmission show acknowledgement like 'OK' on display |
| LE (Left Front) | Send RE message with ID indicating position Is Left Front | Receive RE transmission show acknowledgement Like 'OK' on display |
| RE (Right Front) | Send RE message with ID indicating position Is Right Front | Receive RE transmission show acknowledgement Like 'OK' on display |
| LR (Left Rear) | Send RE message with ID indicating position Is Left Rear. | Receive RE transmission show acknowledgement Like 'OK' on display |
| RR (Right Rear) | Send RE message with ID indicating position Is Right Rear. | Receive RE transmission show acknowledgement Like 'OK' on display |

The commands listed in Table 1 are transmitted in at least one of a request signal and a instruction signal. Table 2 is an example of the makeup of the signal and what is contained in each field thereof.

TABLE 2

| Preamble | Start Field | Command | Data | Sum Check | Stop |
| --- | --- | --- | --- | --- | --- |
| Preamble | The preamble is the first part of the message to be transmitted, and is a series of bits, usually either logic high or all logic low, that is used by the receiving device to determine that a low frequency transmission is present and that commands and data will immediately follow - usually after a start field. | | | | |
| Start field | One or more bits with a unique pattern that follows the preamble that allows the RF receiver to determine that actual data follows | | | | |

TABLE 2-continued

| | |
|---|---|
| Command field | A series of bits or bytes that define a specific command (i.e. send pressure data, send temp data, etc) |
| Data field | A field which contains data such as position (LF, RF, etc,) or data such as low pressure threshold |
| Sum Check | A field used by the receiving device to test the integrity of the message. This could also be a CRC field instead of a Sum Check field |
| Stop Bit | An optional bit or bits placed at the end of the transmission to indicate the transmission is complete |

Upon receiving the at least one of request signal and instruction signal, a response signal is generated by the sensor 46. Table 3 below details the construction of that signal.

TABLE 3

| Preamble | Start | ID | Data | Status | Sum Check | Stop |
|---|---|---|---|---|---|---|
| Preamble | The preamble is the first part of the message to be transmitted, and is a series of bits, usually either logic high or all logic low, that is used by the RE receiving device to determine that an RF transmission is present and that commands and data will immediately follow - usually after a start field. | | | | | |
| Start field | One or more bits with a unique pattern that follows the preamble that allows the RE receiver to determine that actual data follows | | | | | |
| ID field | A series of bits or bytes that define unique ID for a given sensor/transmitter unit (some sensor/transmitters may not employ the use of a unique ID). | | | | | |
| Data field | A field which contains data such as pressure and temperature | | | | | |
| Status field | A field which contains specific information such as whether the RE transmission was generated due to a low pressure condition, in direct response to a hand held request for pressure data, or position data such as LF, RE, RR, LR, etc, when instructed to send such information by the hand held communication device. The presence of LE, RE, RR, or LR data would instruct the vehicle's receiver to update the sensor/transmitter ID for that particular position. | | | | | |
| Sum Check | A field used by the receiving device to test the integrity of the message. This could also be a CRC field instead of a Sum Check field | | | | | |
| Stop Bit | An optional bit or bits placed at the end of the transmission to indicate the transmission is complete. | | | | | |

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device for interrogating a data sensor positioned within each tire of a vehicle comprising:
 a) A handheld wand remotely located from each said data sensor;
 b) Said wand comprising a remote housing and a handle housing, said handle housing containing a processor and having a keypad and a display for displaying a data signal received from a sensor, said remote housing containing a transceiver for sending an initiating signal to activate said sensor and receive data signal sent by said sensor, and an extension tube connecting said remote housing to said handle housing, whereby said keypad provides instructions to said transceiver in said remote housing, and whereby said extension tube allows a user to plaice said remote housing adjacent said sensor within said tire;
 c) Said keypad having an input button connected to said processor for activation of said transceiver to send said initiating signal to said sensor;
 d) Said display connected to said processor for displaying data thereon; wherein said sensor generates, in response to said initiating signal, the data signal having data corresponding to at least one of a sensed and a stored data value, said data signal received by said wand for display on said display;
 e) Each said sensor being programmed with a unique ID number for a particular tire and positional data corresponding to a position of said tire on the vehicle;
 f) Said processor having a record of the tire in which each sensor is located; and
 g) Said keypad having a plurality of input buttons for re-associating the unique ID number with correct positional data in each said sensor when said tire rotated into a new position on said vehicle and a button for each wheel on the vehicle for displaying data obtained for a particular tire, whereby the processor is reprogrammed when said remote housing is placed adjacent a wheel which has been moved to a different location on said vehicle and an additional button on said keypad corresponding to a different position is pressed.

2. The device as recited in claim 1, wherein said initiating signal is at least one of a request and an instruction signal.

3. The device as recited in claim 2, wherein request signal includes request data for requesting said at least one of sensed data and stored data.

4. The device as recited in claim 2, wherein said instruction signal includes data for replacing said stored data with a new data value.

5. The device as recited in claim 1, wherein said handle housing includes a plurality of buttons each connected to and controlling the processor to operate a number of functions including the establishment of threshold pressure and temperature data values in the sensor for each of said tires.

6. The device as recited in claim 5, in which said buttons on said hand housing includes buttons for increasing and decreasing a value of a new threshold pressure value in a sensor.

7. The device as recited in claim 6, where said extension tube includes means for telescopically adjusting length of said tube.

8. The device as recited in claim 7, further comprising connection wires within said extension tube for connecting said remote housing to said handle housing.

9. The device as recited in claim 8, wherein each sensor transmits said unique identification therewith.

10. The device as recited in claim 9, wherein each sensor transmits said positional data associated therewith.

\* \* \* \* \*